United States Patent
Iwahashi et al.

(10) Patent No.: US 10,414,121 B2
(45) Date of Patent: Sep. 17, 2019

(54) HARD COAT FILM, POLARIZING PLATE INCLUDING THE SAME, IMAGE DISPLAY DEVICE, AND METHOD FOR PRODUCING HARD COAT FILM

(71) Applicant: FUJIFILM Corporation, Tokyo (JP)

(72) Inventors: Nobutaka Iwahashi, Kanagawa (JP); Ryuji Saneto, Kanagawa (JP); Yuuichi Fukushige, Kanagawa (JP); Kenta Watanabe, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/255,465

(22) Filed: Sep. 2, 2016

(65) Prior Publication Data

US 2016/0368241 A1 Dec. 22, 2016

Related U.S. Application Data

(63) Continuation of application No. PCT/JP2015/055896, filed on Feb. 27, 2015.

(30) Foreign Application Priority Data

Mar. 5, 2014 (JP) ................................. 2014-043334

(51) Int. Cl.
*B32B 7/02* (2019.01)
*G02B 5/30* (2006.01)
(Continued)

(52) U.S. Cl.
CPC ............ *B32B 7/02* (2013.01); *B29C 35/0805* (2013.01); *B29C 41/26* (2013.01); *B32B 23/04* (2013.01);
(Continued)

(58) Field of Classification Search
CPC .................................. B32B 7/02; B29C 41/26
(Continued)

(56) References Cited

U.S. PATENT DOCUMENTS

| | | | | |
|---|---|---|---|---|
| 2010/0027117 A1* | 2/2010 | Suzuki | ................... | G02B 1/105 359/489.2 |
| 2010/0208350 A1* | 8/2010 | Yoshihara | ................ | G02B 1/12 359/585 |
| 2011/0242654 A1* | 10/2011 | Asahi | ................... | C09D 127/20 359/488.01 |

FOREIGN PATENT DOCUMENTS

| | | |
|---|---|---|
| JP | 2002-265650 A | 9/2002 |
| JP | 2009-186760 A | 8/2009 |

(Continued)

OTHER PUBLICATIONS

Machine_English_translation_JP_2013141771a; Tazaki, Keiko et al.; Optical Laminate and Method for Producing the Same; Jul. 22, 2013; JPO; whole document.*

(Continued)

*Primary Examiner* — Tahseen Khan
(74) *Attorney, Agent, or Firm* — Edwards Neils LLC; Jean C. Edwards, Esq.

(57) ABSTRACT

One embodiment of the present invention relates to a hard coat film including a first layer in which a polymer of a polymerizable composition containing at least one polyfunctional polymerizable compound having two or more polymerizable groups in one molecule is detected as a main component and an organic solvent-soluble resin is not detected by composition analysis using a RAMAN spectroscopy; and a second layer adjacent to the first layer, in which an organic solvent-soluble resin and a polymer of a polymerizable composition containing at least one polyfunctional polymerizable compound having two or more polymerizable groups in one molecule are detected by the com- (Continued)

position analysis, and a thickness is greater than 15 µm. Further, the present invention relates to a polarizing plate, an image display device, and a method for producing the hard coat film.

21 Claims, 5 Drawing Sheets

(51) Int. Cl.
G02B 1/14 (2015.01)
B32B 23/04 (2006.01)
B32B 23/08 (2006.01)
B29C 35/08 (2006.01)
B29C 41/26 (2006.01)
B32B 27/08 (2006.01)
B29L 7/00 (2006.01)

(52) U.S. Cl.
CPC .............. *B32B 23/08* (2013.01); *B32B 27/08* (2013.01); *G02B 1/14* (2015.01); *G02B 5/305* (2013.01); *G02B 5/3033* (2013.01); *B29C 2035/0827* (2013.01); *B29L 2007/008* (2013.01); *B32B 2307/42* (2013.01); *B32B 2307/536* (2013.01); *B32B 2307/554* (2013.01); *B32B 2457/20* (2013.01)

(58) Field of Classification Search
USPC ......................................................... 428/216
See application file for complete search history.

(56) References Cited

FOREIGN PATENT DOCUMENTS

| JP | 2011-127199 A | 6/2011 |
|---|---|---|
| JP | 2012-096523 A | 5/2012 |
| JP | 2012-240235 A | 12/2012 |
| JP | 2013-141771 A | 7/2013 |
| JP | 2013141771 a | * 7/2013 |

OTHER PUBLICATIONS

Notification of Reasons for Refusal issued by the Japanese Patent Office dated May 16, 2017, in connection with Japanese Patent Application No. 2015-038599.
First Office Action issued by the State Intellectual Property Office (SIPO) dated Apr. 20, 2017 in connection with Chinese Patent Application No. 201580011956.4.
Notification of Reasons for Refusal issued by the Japanese Patent Office dated Dec. 6, 2016, in connection with Japanese Patent Application No. 2015-038599.
International Preliminary Report on Patentability issued by WIPO dated Sep. 15, 2016, in connection with International Patent Application No. PCT/JP2015/055896.
International Search Report issued in connection with International Patent Application No. PCT/JP2015/055896 dated Apr. 28, 2015.
Written Opinion issued in connection with International Patent Application No. PCT/JP2015/055896 dated Apr. 28, 2015.

* cited by examiner

HARD COAT FILM, POLARIZING PLATE INCLUDING THE SAME, IMAGE DISPLAY DEVICE, AND METHOD FOR PRODUCING HARD COAT FILM

CROSS-REFERENCE TO RELATED APPLICATIONS

This application is a Continuation of PCT International Application No. PCT/JP2015/055896 filed on Feb. 27, 2015, which was published under PCT Article 21(2) in Japanese, and which claims priority under 35 U.S.C § 119(a) to Japanese Patent Application No. 2014-043334 filed on Mar. 5, 2014. The above applications are hereby expressly incorporated by reference, in their entirety, into the present application.

BACKGROUND OF THE INVENTION

1. Field of the Invention

The present invention relates to a hard coat film, a polarizing plate including the hard coat film, an image display device, and a method for producing the hard coat film.

2. Description of the Related Art

Recently, various hard coat films have been proposed as a protective film or the like of an image display device such as a liquid crystal display device (for example, refer to JP2009-186760A and JP2012-96523A).

SUMMARY OF THE INVENTION

In JP2009-186760A and JP2012-96523A, a hard coat film having a laminated structure in which a hard coat layer is provided on a base film is disclosed. In general, the hard coat film is able to contribute to the improvement of the abrasion resistance of the image display device or the like. Further, the hard coat film having a laminated structure is advantageous from the viewpoint of further improving abrasion resistance due to a hard coat layer.

A method (hereinafter, referred to as a "coating method") in which the hard coat layer is formed by performing a polymerization treatment with respect to a polymerizable composition (a hard coat liquid) applied on the base film has been known as a preparation method of the hard coat film having a laminated structure from the related art (for example, refer to JP2009-186760A).

On the other hand, the hard coat film is required to have sufficient durability in order to protect the image display device or the like which includes the hard coat film for a long period of time. In the hard coat film having a laminated structure, it is desirable that peeling does not occur between the layers from the viewpoint of the durability. However, in the hard coat film having a laminated structure which is prepared by the coating method of the related art, in general, adhesiveness between the hard coat layer and the base film is not sufficient, and further enhancement is required in order to make the abrasion resistance and the durability compatible.

In response, in JP2012-96523A, it is disclosed that the adhesiveness between the hard coat layer and the base film is able to be improved, and a hard coat film exhibiting high pencil hardness is able to be obtained, according to a technology disclosed in JP2012-96523A.

However, examples of a test method for the abrasion resistance of a film such as the hard coat film are able to include a pencil hardness test disclosed in JP2012-96523A and an abrasion resistance test (hereinafter, also referred to as an "SW resistance test") using steel wool. The SW resistance test is a test method in which film abrasion resistance is evaluated according to a change on a film surface (the generation of a scratch, a change in the shade, or the like) at the time of repeatedly rubbing the film surface with the steel wool. On the other hand, the pencil hardness test is a test in which the presence or absence of the scratch at the time of pressing and moving the lead of the pencil against the film surface is evaluated. In both of the test methods, the abrasion resistance of the film is evaluated by similarly reproducing a generation factor of a scratch which is able to be generated at the time of actually using the film. In both of the test methods, the generation factors of the scratch to be similarly reproduced are different from each other. Therefore, a film having an excellent result in both of the test methods rather than a film having an excellent result in only one test method indicates a film in which a rubbing scratch due to various factors is rarely generated at the time of actually using the film and the abrasion resistance is excellent. Regarding this viewpoint, as described above, in JP2012-96523A, it is disclosed that a hard coat film having an excellent result in the pencil hardness test is able to be obtained. However, according to the studies of the present inventors, further enhancement is required in order to obtain a hard coat film having excellent abrasion resistance and an excellent result in both of the test methods of the pencil hardness test and the SW resistance test along with high durability (specifically, high adhesiveness between layers).

Therefore, an object of the present invention is to provide a hard coat film having high abrasion resistance and high durability.

As a result of intensive studies of the present inventors for attaining the object described above, it has been newly found that the object described above is able to be attained by a hard coat film, comprising: a first layer in which a polymer of a polymerizable composition containing at least one polyfunctional polymerizable compound having two or more polymerizable groups in one molecule is detected as a main component and an organic solvent-soluble resin is not detected by composition analysis using a RAMAN spectroscopy; and a second layer adjacent to the first layer, in which an organic solvent-soluble resin and a polymer of a polymerizable composition containing at least one polyfunctional polymerizable compound having two or more polymerizable groups in one molecule are detected by the composition analysis, and a thickness is greater than 15.0 μm.

The composition analysis using the RAMAN spectroscopy is one of analysis methods in which the composition of a film sample is able to be accurately analyzed. The present inventors have assumed that the first layer in which the polymer of the polymerizable composition containing at least one polyfunctional polymerizable compound is detected as a main component by such composition analysis, and the organic solvent-soluble resin which is generally used for configuring a base film is not detected contributes to the improvement of the abrasion resistance of the hard coat film, and specifically, contributes to the obtainment of a hard coat film which is able to have an excellent result in both of the pencil hardness test and the SW resistance test.

In contrast, in JP2012-96523A described above, it is disclosed that the hard coat film disclosed in JP2012-96523A contains cellulose acylate which is one type of the organic solvent-soluble resin in all layers of a base film (in JP2012-96523A, referred to as the base film), a hard coat, and a mixed layer positioned between the base film and the hard coat. The present inventors have considered that in such a hard coat film, the first layer described above (a layer in which the organic solvent-soluble resin is not detected by the composition analysis using the RAMAN spectroscopy, and the polymer described above is detected as a main component) does not exist, and thus, an excellent result is obtained in the pencil hardness test, but the abrasion resistance evaluated by the SW resistance test is required to be further enhanced.

Further, the hard coat film described above includes the second layer described above as a layer adjacent to the first layer. Here, in the present invention, "adjacent" with respect to two layers indicates that the two layers are directly in contact with each other without using an adhesive layer or a pressure sensitive adhesive layer. Preferably, "adjacent" indicates that the two layers are bonded to each other by at least one of chemical bonding or physical bonding in at least a part of the interface of both layers. Furthermore, "adjacent" with respect to a layer described below also has the same meaning as described above.

The present inventors have considered that the second layer adjacent to the first layer contains the organic solvent-soluble resin and the polymer of the polymerizable composition containing at least one polyfunctional polymerizable compound as with the first layer, and has a thickness of greater than 15.0 µm, and thus, contributes to the improvement of adhesiveness between the first layer and the second layer.

Furthermore, in the present invention, the composition of each of the layers, and the thickness of each of the layers are determined by the following method.

The hard coat film is cut in a thickness direction, measurement portions are obtained on a sectional surface from the surface of the hard coat film in the thickness direction at an interval of 0.5 µm, and composition analysis is performed in each of the measurement portion by using a RAMAN spectroscopy. Here, the reason for defining the measurement interval as 0.5 µm is because spatial resolution of the measurement using RAMAN spectroscopy is considered. Furthermore, in a case where the measurement is performed from one surface which is set as a start point of the composition analysis (a first measurement portion) to the other surface at an interval of 0.5 µm, an interval between a second measurement portion from the last measurement portion and a measurement portion (on the other surface) which becomes an end point of the measurement may be less than 0.5 µm, but this is allowable. For example, in a plurality of measurement positions separated in an in-plane direction at a constant interval of approximately 1 cm to 10 cm, the measurement portions may be obtained in the thickness direction as described above at an interval of 0.5 µm. As a result of the composition analysis, a region which is a certain region directed towards the thickness direction from the surface of the hard coat film and includes a measurement portion in which the organic solvent-soluble resin is not detected, and the polymer described above is detected as a main component is defined as the first layer. Furthermore, in the hard coat film in which the organic solvent-soluble resin is not detected, and the polymer described above is detected as a main component, any one certain region of both regions of a certain region directed towards the thickness direction from one surface of the hard coat film and a certain region directed towards the thickness direction from the other surface may be determined as the first layer. In this case, the other certain region is able to be another first layer described below.

In the second layer, a region which is positioned on the lower portion of the first layer in a film thickness direction from the surface of the hard coat film adjacent to the first layer and includes a measurement portion in which both of the organic solvent-soluble resin and the polymer described above are detected is defined as the second layer.

The details of the composition analysis using the RAMAN spectroscopy will be described in detail in examples described below. In addition, in a case of a hard coat film in which the constituent is unknown, the constituent is separated from the hard coat film by a known separation method such as solvent extraction, and the separated constituent is able to be identified by a known identification method. The constituent identified as described above is subjected to the composition analysis using the RAMAN spectroscopy, and thus, the composition of each of the layers is able to be determined. Examples of the identification method are able to include a magnetic nuclear resonance spectroscopy (an NMR method), an infrared spectroscopy (an IR method), a mass analysis method (an MS method), and the like.

Furthermore, in the composition analysis described above, being "defined as a main component" indicates being detected as a component which is most substantially contained in the components detected by the composition analysis described above. For example, in the first layer, it is indicated that the content of the polymer described above is quantified to be greater than or equal to 85 mass % in a quantification result according to the composition analysis using the RAMAN spectroscopy, and a case where the content is quantified to be 100 mass % is also included.

On the other hand, in the composition analysis described above, the organic solvent-soluble resin "not being detected" includes a case where the organic solvent-soluble resin is not contained at all and a case where the organic solvent-soluble resin is slightly contained in the amount of less than the detection limit of the RAMAN spectroscopy. The detection limit of the RAMAN spectroscopy, for example, is less than or equal to 1 mass %. In addition, the thickness of the first layer is determined as described below, and thus, in a case where a micro region (a micro region having spatial resolution less than the spatial resolution of the RAMAN spectroscopy) in the vicinity of a boundary between the first layer and the second layer is subjected to the composition analysis using the RAMAN spectroscopy, the organic solvent-soluble resin may be detected, but such a first layer is also included in the first layer of the present invention.

In addition, the sectional surface to be subjected to the composition analysis is at least one surface, or may be a plurality of sectional surfaces of two or more portions cut at an arbitrary position. A sectional surface is able to be obtained in positions separated at a constant interval of approximately 1 cm to 10 cm, as an example. The number of a plurality of sectional surfaces, for example, is approximately 2 to 20. In addition, in a case where the composition analysis is performed with respect to the plurality of sectional surfaces, each of the layers is defined according to the arithmetic average value of the analysis results of the plurality of sectional surfaces.

The thickness of the first layer is determined as follows.

In the composition analysis performed from the surface of the hard coat film to the thickness direction at an interval of 0.5 µm, a (m−1)-th measurement portion from the surface of the hard coat film (the first measurement portion) is a measurement portion positioned on the most other surface side (the end point side of the composition analysis) among measurement portions in which the organic solvent-soluble resin is not detected, and the polymer described above is detected as a main component, and in a case where the organic solvent-soluble resin and the polymer described above are detected in an m-th measurement portion, the thickness of the first layer is determined as (m−1)×0.5 μm. In a case where the organic solvent-soluble resin and the polymer described above are detected on the surface of the hard coat film (the first measurement portion), the thickness of the first layer is determined as 0 μm. That is, the first layer is determined as not existing.

Next, the thickness of the second layer is determined as follows.

A distance between a measurement portion (an n-th measurement portion) separated furthest from the m-th measurement portion among the measurement portions where both of the organic solvent-soluble resin and the polymer described above are detected, which is a measurement portion of a position directed towards the other surface side (the end point side of the composition analysis) farther than the m-th measurement portion described above, and the m-th measurement portion is set to the thickness of the second layer. That is, the thickness of the second layer is determined as (n−m)×0.5 μm. In a case where the organic solvent-soluble resin and the polymer described above are detected in all measurement portions from an (m+1)-th measurement portion to a measurement portion (that is, a measurement portion on a surface on a side opposite to the surface on which the measurement starts) which is the end point of the measurement, the hard coat film is determined as a hard coat film formed of the first layer and the second layer. In this case, the n-th measurement portion is positioned on the surface on a side opposite to the surface on which the measurement starts. Here, as described above, in a case where an interval (hereinafter, referred to as L μm) between the second measurement portion from the last measurement portion (an (n−1)-th measurement portion) and the measurement portion (on the other surface; the n-th measurement portion) which is the end point of the measurement is less than 0.5 μm, the thickness of the second layer is determined as [[(n−1)−m]×0.5+L] μm.

On one hand, a hard coat film in which the polymer described above is not detected, and the organic solvent-soluble resin is detected as a main component in measurement portions after an (n+1)-th measurement portion is determined as a hard coat film including a third layer described below. On the other hand, a hard coat film in which the organic solvent-soluble resin is not detected, and the polymer described above is detected as a main component in the measurement portions after the (n+1)-th measurement portion is determined as a hard coat film including another first layer described below. The thickness of the third layer and the another first layer is also determined as described above.

Furthermore, in a case where one or more other layers are laminated on the surface of the hard coat film, the existence of the other layer is able to be confirmed by observing the sectional surface using various microscopes such as an optical microscope and a scanning type electron microscope (SEM). In a case where the existence of the other layer is confirmed by observing the sectional surface as described above, the composition of the each of the layers and the thickness of the each of the layers are determined by the same method as described above except that an interface between the other layer and the hard coat film is set as the start point or the end point of the composition analysis described above.

The thickness of each of the layers is measured at one arbitrary portion or two or more of a plurality of portions in a sectional image of at least one sectional surface. In a case where a plurality of sectional surfaces are obtained and/or a case where a plurality of measurement portions are obtained in one sectional surface, the thickness of each of the layers is obtained as the arithmetic average value of a plurality of measured values.

In the hard coat film, a position from which a sample to be subjected to the analysis described above is sampled is able to be arbitrarily selected. It is preferable that the position is selected according to the area of the hard coat film which is an analysis target, the thickness of each of the layers, and an in-plane variation in the composition such that the average properties of the entire hard coat film are obtained. Examples of a method of selecting the position from which the measurement sample is sampled are able to include a method of taking a measurement sample from a region positioned in an inner portion from the outside surface of the hard coat film by greater than or equal to 1 cm. Here, the method described above is merely an example, and the present invention is not limited thereto.

The other layers described below will be defined as described above.

In the present invention, "organic solvent-soluble" indicates that being dissolved in an organic solvent at a liquid temperature of 25° C. in the amount of greater than or equal to 1 mass %. Here, the organic solvent, for example, indicates an organic solvent which is a liquid at 25° C. and 1 atm, and a composition in which one or a plurality of compounds selected from the group consisting of organic compounds having greater than or equal to 1 and less than or equal to 8 carbon atoms are mixed at an arbitrary ratio. Specifically, examples of the organic solvent include aliphatic hydrocarbons such as pentane, hexane, cyclohexane, octane, and isooctane, aromatic hydrocarbons such as benzene, toluene, and xylene, alcohols such as methanol, ethanol, 1-propanol, 2-propanol, 1-butanol, 2-butanol, 2-methyl-1-propanol, 2-methyl-2-propanol, 1-hexanol, cyclohexanol, 1-octanol, and ethylene glycol, ketones such as acetone, methyl ethyl ketone, methyl isobutyl ketone, and cyclohexanone, esters such as methyl acetate, ethyl acetate, butyl acetate, ethyl propionate, and propylene glycol monomethyl ether acetate (PGMEA), ethers such as diethyl ether, tetrahydrofuran, and dioxane, halogenated alkyls such as dichloromethane, chloroform, and 1,2-dichloroethane, and a composition in which the organic solvents described above are mixed at an arbitrary ratio. The second layer is a layer containing a resin (the organic solvent-soluble resin) exhibiting the organic solvent-solubility described above. On one hand, the polymer described above contained in the second layer along with the organic solvent-soluble resin does not generally exhibit the organic solvent-solubility described above as the polymer. On the other hand, there are many cases where the polyfunctional polymerizable compound to be used for obtaining the polymer exhibits the organic solvent-solubility. It is preferable that the hard coat film which contains such a polymer in the first layer as a main component and contains the polymer in the second layer having a thickness of greater than 15 μm along with the organic solvent-soluble resin is able to be produced by a production method described below.

Furthermore, in the present invention, a solvent which is able to be used for forming the hard coat film is not limited to the solvents described above.

In one embodiment, the organic solvent-soluble resin contains cellulose acylate.

In one embodiment, the polymerizable group of the polyfunctional polymerizable compound is an ethylenically unsaturated bond-containing group.

In one embodiment, the ethylenically unsaturated bond-containing group is a polymerizable group selected from the group consisting of an acryloyl oxy group, a methacryloyl oxy group, an acryloyl group, and a methacryloyl group.

In one embodiment, the hard coat film described above comprises a third layer adjacent to the second layer on a side opposite to the first layer. The third layer is a layer in which a polymer of a polymerizable composition containing at least one polyfunctional polymerizable compound having two or more polymerizable groups in one molecule is not detected and an organic solvent-soluble resin is detected as a main component by the composition analysis using the RAMAN spectroscopy.

In one embodiment, the hard coat film described above is formed of the first layer and the second layer.

In one embodiment, the hard coat film described above comprises another first layer adjacent to the second layer on a side opposite to the first layer. This another first layer is a layer in which a polymer of a polymerizable composition containing at least one polyfunctional polymerizable compound having two or more polymerizable groups in one molecule is detected as a main component and an organic solvent-soluble resin is not detected by the composition analysis using the RAMAN spectroscopy.

In one embodiment, a thickness of the second layer is greater than 15.0 μm and less than or equal to 500.0 μm.

In one embodiment, a thickness of the first layer is greater than or equal to 0.5 μm and less than or equal to 20.0 μm.

In one embodiment, the hard coat film described above further comprises an ultraviolet absorbent.

In one embodiment, the hard coat film described above further comprises a surfactant.

Another embodiment of the present invention relates to a method for producing the hard coat film described above, comprising: forming a web by casting a composition (hereinafter, also referred to as a "composition for casting film formation") containing a polymerizable composition containing at least one polyfunctional polymerizable compound having two or more polymerizable groups in one molecule, an organic solvent-soluble resin, and an organic solvent onto a support; and performing a polymerization treatment of the polymerizable compound with respect to the web; and further comprising performing a web heat treatment of the web formed by the casting to providing a surface layer region which becomes a first layer by the polymerization treatment described above on at least one surface layer side of the web.

In one embodiment, the polyfunctional polymerizable compound is leached onto a surface of the web by a web heat treatment.

In one embodiment, the polymerization treatment is performed by heating.

In one embodiment, the polymerization treatment is performed by light irradiation.

In one embodiment, the casting is performed by co-casting the composition for casting film formation described above and other compositions (hereinafter, also referred to as a "composition for co-casting").

In one embodiment, the composition for co-casting is a composition which contains an organic solvent-soluble resin, and does not contain a polyfunctional polymerizable compound having two or more polymerizable groups in one molecule. Here, "not containing" indicates that not being actively added as a component for preparing a composition.

Still another embodiment of the present invention relates to a polarizing plate comprising a polarizer, and the hard coat film described above.

Still another embodiment of the present invention relates to an image display device comprising the hard coat film described above.

In one embodiment, the image display device described above comprises the polarizing plate described above, and the polarizing plate includes the hard coat film described above.

In one embodiment, the image display device described above comprises the polarizing plate described above on at least a visible side.

According to the present invention, it is possible to provide a hard coat film having excellent abrasion resistance and excellent durability. Specifically, it is possible to provide a hard coat film which is able to have an excellent result in a SW resistance test and a pencil hardness test, and has excellent adhesiveness between the first layer and the second layer. Further, it is possible to provide a polarizing plate and an image display device which have high durability by using such a hard coat film as a protective film.

DESCRIPTION OF THE PREFERRED EMBODIMENTS

The following description is based on representative embodiments of the present invention, but the present invention is not limited to the embodiments. Furthermore, in the present invention and herein, a numerical range denoted by using "to" indicates a range including numerical values before and after "to" as the lower limit value and the upper limit value.

[Hard Coat Film]

A hard coat film according to one embodiment of the present invention includes a first layer in which a polymer of a polymerizable composition containing at least one polyfunctional polymerizable compound having two or more polymerizable groups in one molecule is detected as a main component and an organic solvent-soluble resin is not detected by composition analysis using a RAMAN spectroscopy, and a second layer adjacent to the first layer, in which an organic solvent-soluble resin and a polymer of a polymerizable composition containing at least one polyfunctional polymerizable compound having two or more polymerizable groups in one molecule are detected by the composition analysis, and a thickness is greater than 15.0 μm.

Hereinafter, the hard coat film described above will be described in more detail.

Figure 1A:
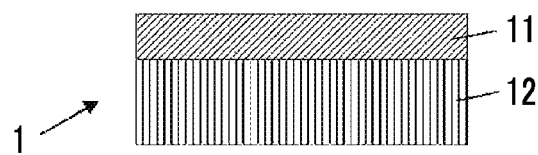
FIGS. 1A to 1C illustrate an example (a schematic sectional view) of a specific embodiment of a hard coat film according to one embodiment of the present invention.
Figure 1B:
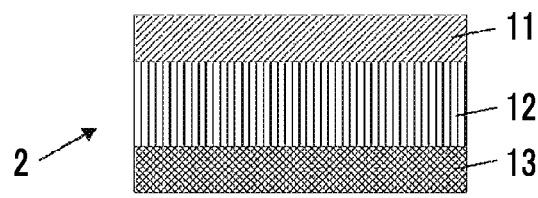
Figure 1C:
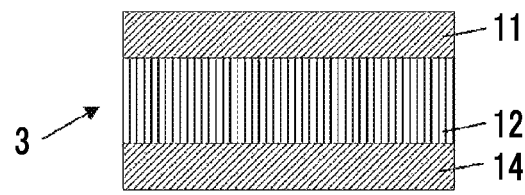

In FIGS. 1A to 1C, an example (a schematic sectional view) of a specific embodiment of the hard coat film according to one embodiment of the present invention is illustrated. Furthermore, a configuration such as a relationship or the like between thicknesses of the respective layers in the drawings is merely an example, and the present invention is not limited to such a specific embodiment.

A hard coat film 1 illustrated in FIG. 1A is a hard coat film formed of two layers of a first layer 11, and a second layer 12 adjacent to the first layer. FIG. 1B illustrates a hard coat film formed of three layers of the first layer 11, the second layer 12 adjacent to the first layer, and a third layer 13 adjacent to the second layer. FIG. 1C illustrates a hard coat film formed of three layers of the first layer 11, the second layer 12 adjacent to the first layer, and another first layer 14 adjacent to the second layer.

Hereinafter, the respective layers included in the hard coat film described above will be sequentially described.

First Layer

As described above, the first layer is a layer in which the polymer of the polymerizable composition containing at least one polyfunctional polymerizable compound having two or more polymerizable groups in one molecule is detected as a main component and the organic solvent-soluble resin is not detected by the composition analysis using the RAMAN spectroscopy. By performing a polymerization treatment with respect to the polymerizable composition containing at least one polyfunctional polymerizable compound, it is possible to form a crosslinking polymer (hereinafter, a homopolymer and a copolymer are included in the polymer) having a crosslinking structure. The crosslinking polymer is able to exhibit a high strength, and thus, in the hard coat film described above including the first layer which contains the crosslinking polymer as a main component, a scratch is rarely generated on the surface, and high abrasion resistance is able to be exhibited.

In the first layer, in the composition analysis using the RAMAN spectroscopy, the polymer described above is detected as the most substantially contained component (a main component). In a quantification result of the composition analysis using the RAMAN spectroscopy, as described above, the content of the polymer described above, for example, is quantified to be greater than or equal to 85 mass %. The content of the polymer described above to be quantified is preferably greater than or equal to 90 mass %, is more preferably greater than or equal to 95 mass %, and is even more preferably greater than or equal to 98 mass %, from the viewpoint of further enhancing the hardness of the hard coat film. In addition, the content of the polymer described above to be quantified, for example, is less than or equal to 99.99 mass %, but the upper limit is not particularly limited, and may be 100 mass %. Furthermore, in the first layer, a polymer concentration has a concentration gradient in a thickness direction. For example, in the first layer, an embodiment in which the polymer concentration increases towards the surface of the first layer at least continuously or intermittently, and the like are included in one embodiment of the present invention.

(Polymer)

The polyfunctional polymerizable compound configuring the polymer contained in the first layer may be a monomer, or a multimer such as an oligomer or a prepolymer insofar as two or more polymerizable groups are included in one molecule. In addition, the polymerizable compound may contain a monofunctional compound having one polymerizable group in one molecule along with the polyfunctional polymerizable compound. The monofunctional compound may be a monomer, or a multimer such as an oligomer or a prepolymer. The molecular weight of the polymerizable compound, for example, is greater than or equal to 80 and less than or equal to 30,000, is preferably greater than or equal to 100 and less than or equal to 10,000, and is more preferably greater than or equal to 150 and less than or equal to 5,000. In the present invention, the molecular weight indicates the weight-average molecular weight of the multimer which is measured in terms of polystyrene by using a gel permeation chromatography (GPC). Furthermore, in a case where the hard coat film described above is produced by the production method described below, examples of preferred means for easily forming the first layer by allowing the polyfunctional polymerizable compound to exist (unevenly exist) on at least one surface layer region of the web at a concentration higher than that of the other region are able to include a method using a compound having a comparatively large molecular weight as the polyfunctional polymerizable compound, or a method using a composition having a comparatively high polyfunctional polymerizable compound concentration as a composition for casting film formation. From this viewpoint, in one embodiment, a compound having a molecular weight of greater than or equal to 250 is preferable, a compound having a molecular weight of greater than or equal to 500 is more preferable, and a compound having a molecular weight of greater than or equal to 1,000 is even more preferable, as the polyfunctional polymerizable compound. In this regard, in a polymerizable composition containing a mixture of two or more of a plurality of polyfunctional polymerizable compounds having different molecular weights, the molecular weight of the polyfunctional polymerizable compound may be the weight-average molecular weight of the mixture. Here, casting film formation is performed by using a polyfunctional polymerizable compound having a molecular weight of less than 250, and by using a composition containing the polyfunctional polymerizable compound at a high concentration, and thus, the first layer may be able to be easily formed. Therefore, the molecular weight of the polyfunctional polymerizable compound is not limited to the range described above.

The amount of polyfunctional polymerizable compound with respect to 100 mass % of the total amount of the polymerizable composition is preferably greater than or equal to 20 mass %, and is more preferably greater than or equal to 40 mass %, from the viewpoint of obtaining a hard coat film having higher hardness. The total amount of polymerizable composition may be the total amount of one or more types of polyfunctional polymerizable compounds. On the other hand, the amount of polyfunctional polymerizable compound with respect to 100 mass % of the total amount of polymerizable composition is preferably less than or equal to 99 mass %, and is more preferably less than or equal to 95 mass %, from the viewpoint of the brittleness of the hard coat film. On the other hand, the monofunctional polymerizable compound may be used by being combined with the polyfunctional polymerizable compound, or may not be used by being combined with the polyfunctional polymerizable compound. In a case where the monofunctional polymerizable compound is used by being combined with the polyfunctional polymerizable compound, it is preferable that the monofunctional polymerizable compound, for example, is used in the amount of 1 mass % to 20 mass % with respect to 100 mass % of the total amount of polymerizable composition, from the viewpoint of decreasing the viscosity of the polymerizable composition and facilitating handling. Furthermore, two or more types of polyfunctional polymerizable compounds or two or more types of monofunctional polymerizable compounds are able to be used in combination as the polymerizable compound.

The polymerizable group may be a radically polymerizable group or a cationically polymerizable group, and the radically polymerizable group is preferable as the polymerizable group. A polymerizable group such as an ethylenically unsaturated bond-containing group, an epoxy group, an oxetane group, and a methylol group is preferable from the viewpoint of forming a crosslinking structure by allowing a reaction to excellently progress, and the ethylenically unsaturated bond-containing group is more preferable. Examples of the ethylenically unsaturated bond-containing group are able to include a (meth)acryloyl oxy group, a (meth)acryloyl group, a vinyl group, a styryl group, and an allyl group, and among them, the (meth)acryloyl oxy group and the (meth)acryloyl group are more preferable, and the (meth)acryloyl oxy group is even more preferable. Furthermore, in the present invention, the "(meth)acryloyl oxy group" indicates at least one of an acryloyl oxy group or a methacryloyl oxy group. The same applied to a "(meth) acryloyl group", "(meth)acrylate", "(meth)acryl", and the like. The number of polymerizable groups contained in the polyfunctional polymerizable compound is greater than or equal to 2, is preferably in a range of 2 to 20, and is more preferably in a range of 3 to 12, in one molecule.

Examples of one preferred embodiment of the polyfunctional polymerizable compound are able to include a polyfunctional (meth)acrylate-based compound having two or more ethylenically unsaturated bond-containing groups in one molecule.

Specific examples of difunctional (meth)acrylate include ethylene glycol di(meth)acrylate, bisphenol A tetraethoxy di(meth)acrylate, bisphenol A tetrapropoxy di(meth)acrylate, 1,6-hexane diol di(meth)acrylate, neopentyl glycol di(meth)acrylate, and the like. Examples of a commercially available product are able to include LIGHT ACRYLATE NP-A (manufactured by Kyoeisha Chemical Co., Ltd., neopentyl glycol diacrylate, a molecular weight of 212), and the like.

Examples of a trifunctional or more (meth)acrylate-based compound include trimethylol propane tri(meth)acrylate, pentaerythritol tri(meth)acrylate, pentaerythritol tetra(meth) acrylate, dipentaerythritol hexa(meth)acrylate, dipentaerythritol tetra(meth)acrylate, dipentaerythritol penta(meth)acrylate, isocyanuric acid-modified tri(meth)acrylate, and the like. Examples of a commercially available product are able to include KAYARAD DPHA (manufactured by Nippon Kayaku Co., Ltd., dipentaerythritol hexaacrylate, a molecular weight of 579), ARONIX M-309 (manufactured by TOAGOSEI CO., LTD., trimethylol propane triacrylate, a molecular weight of 296), and the like.

In addition, the (meth)acrylate-based compound described above may be a (meth)acrylate-based compound in which a part of the molecular skeleton may be modified. For example, a (meth)acrylate-based compound which is modified by ethylene oxide, propylene oxide, caprolactone, isocyanuric acid, alkyl, cyclic alkyl, aromatic series, bisphenol, and the like is able to be used.

In addition, examples of the polyfunctional polymerizable compound are able to include urethane (meth)acrylate, epoxy (meth)acrylate, polyester (meth)acrylate, polyether (meth)acrylate, a (meth)acrylate-based polymer, and the like. Among them, the urethane (meth)acrylate is preferable from the viewpoint of transparency and a refractive index. The urethane (meth)acrylate is able to be obtained by a reaction between polyhydric alcohol and organic diisocyanate, and hydroxy (meth)acrylate.

Examples of the polyhydric alcohol described above are able to include neopentyl glycol, 3-methyl-1,5-pentane diol, ethylene glycol, propylene glycol, 1,4-butane diol, 1,6-hexane diol, trimethylol propane, pentaerythritol, tricyclodecane dimethylol, bis-[hydroxy methyl]-cyclohexane, and the like; polyester polyol obtained by a reaction between the polyhydric alcohol described above and a polybasic acid (for example, a succinic acid, a phthalic acid, a hexahydrophthalic anhydride, a terephthalic acid, an adipic acid, an azelaic acid, a tetrahydrophthalic anhydride, and the like); polycaprolactone polyol obtained by a reaction between the polyhydric alcohol described above and ε-caprolactone; polycarbonate polyol (for example, polycarbonate diol obtained by a reaction between 1,6-hexane diol and diphenyl carbonate, and the like); and polyether polyol. Examples of the polyether polyol described above are able to include polyethylene glycol, polypropylene glycol, polytetramethylene glycol, ethylene oxide-modified bisphenol A, and the like.

Examples of the organic polyisocyanate described above include an isocyanate compound such as isophorone diisocyanate, hexamethylene diisocyanate, tolylene diisocyanate, xylene diisocyanate, diphenyl methane-4,4'-diisocyanate, and dicyclopentanyl isocyanate, an adduct of the isocyanate compound, a multimer of the isocyanate, or the like.

Examples of the hydroxy (meth)acrylate compound described above include pentaerythritol tri(meth)acrylate, pentaerythritol di(meth)acrylate, dipentaerythritol penta(meth)acrylate, dipentaerythritol tetra(meth)acrylate, hydroxy ethyl (meth)acrylate, hydroxy propyl (meth)acrylate, hydroxy butyl (meth)acrylate, dimethylol cyclohexyl mono (meth)acrylate, hydroxy caprolactone (meth)acrylate, and the like.

Among them, the pentaerythritol tri(meth)acrylate and the dipentaerythritol penta(meth)acrylate are preferable from the viewpoint of further enhancing the hardness of the film.

The urethane (meth)acrylate described above is preferably hexafunctional or more urethane (meth)acrylate, and is more preferably hexafunctional to pentakaidecafunctional urethane (meth)acrylate.

A commercially available product may be used as the urethane (meth)acrylate. Examples of the commercially available product are able to include UV1700B (manufactured by The Nippon Synthetic Chemical Industry Co., Ltd., a weight-average molecular weight of 2,000, and decafunctional urethane (meth)acrylate) and UV7600B (manufactured by The Nippon Synthetic Chemical Industry Co., Ltd., a weight-average molecular weight 1,500, and hexafunctional urethane (meth)acrylate), DPHA40H (manufactured by Nippon Kayaku Co., Ltd., a weight-average molecular weight of 7,000, and decafunctional urethane (meth)acrylate), UX5003 (manufactured by Nippon Kayaku Co., Ltd., a weight-average molecular weight of 700, and hexafunctional urethane (meth)acrylate), UN3320HS (manufactured by Negami Chemical Industrial Co., Ltd, a weight-average molecular weight of 5,000, and pentakaidecafunctional urethane (meth)acrylate), UN904 (manufactured by Negami Chemical Industrial Co., Ltd, a weight-average molecular weight of 4900, and pentakaidecafunctional urethane (meth) acrylate), UN3320HC (manufactured by Negami Chemical Industrial Co., Ltd, a weight-average molecular weight of 1,500, and decafunctional urethane (meth)acrylate), UN3320HA (manufactured by Negami Chemical Industrial Co., Ltd, a weight-average molecular weight of 1,500, and hexafunctional urethane (meth)acrylate), BS577 (manufactured by Arakawa Chemical Industries, Ltd, a weight-average molecular weight of 1,000, and hexafunctional urethane (meth)acrylate), and U15HA (manufactured by Shin Nakamura Chemical Co., Ltd., a weight-average molecular weight of 2300, and pentakaidecafunctional urethane (meth) acrylate), U-6LPA (manufactured by Shin Nakamura Chemical Co., Ltd., a weight-average molecular weight of 800, and hexafunctional urethane (meth)acrylate), and the like.

A fluorine-containing polymerizable compound having one or more fluorine atoms in one molecule, a silicone-based polymerizable compound having one or more siloxane bonds in one molecule, and the like are able to be used as the polyfunctional polymerizable compound. For example, various compounds disclosed in paragraphs 0077 to 0103 of JP2013-130865A are able to be used as the fluorine-containing polymerizable compound. On the other hand, the silicone-based polymerizable compound can be referred to paragraph 0141 of JP2013-130865A and 0119 to 0120 of JP2012-103689A.

The monofunctional compound which is able to be used by being combined with the polyfunctional polymerizable compound described above is not particularly limited. For example, a monofunctional (meth)acrylate-based compound disclosed in paragraph 0022 of WO2012/077807A1, a monofunctional polymerizable compound having only one vinyl bond in one molecule, disclosed in paragraph 0022 of JP2008-178995A, a radically monofunctional polymerizable monomer disclosed in paragraph 0022 of JP2008-119684A, and the like are able to be used.

The polymerizable compound described above may be a thermally polymerizable compound or a photopolymerizable compound. In a case where polymerization is performed by light irradiation, a component having ultraviolet ray absorbing properties is not generally used in combination, but in a case where a polymerization treatment is performed by thermal polymerization, a polymerizable compound having an ultraviolet ray absorbing group is able to be used. Examples of the ultraviolet ray absorbing group include a group having an oxy benzophenone skeleton, a group having a benzophenone skeleton, a group having a benzotriazole skeleton, a group having a triazine skeleton, a group having a salicylic acid ester skeleton, a cyanoacrylate skeleton, and a benzene skeleton, and the like. The details of the polymerizable compound having an ultraviolet ray absorbing group can be referred to paragraphs 0060 to 0079 of JP2004-67816A.

It is preferable that the hard coat layer described above is able to be produced by the production method described below. In such a production method, a part of the polyfunctional polymerizable compound contained in the composition for casting film formation is able to be moved from the inside of the web formed by the casting to a surface layer side. Thus, a surface layer region (a high concentration region) containing a polyfunctional polymerizable compound at a high concentration is formed, and then, the web is subjected to a polymerization treatment, and thus, first layer is able to be obtained as the surface layer region in which the polyfunctional polymerizable compound is polymerized and cured. In addition, in a case where the composition for casting film formation contains a monofunctional compound along with the polyfunctional polymerizable compound, at least a part of the monofunctional polymerizable compound is moved to the surface layer region. In such a case, it is possible to form the first layer containing the polymer of the polymerizable composition which contains the polyfunctional polymerizable compound and the monofunctional polymerizable compound. Further, as described below, the composition for casting film formation is able to contain various additives such as a polymerization initiator, an ultraviolet absorbent, and a surfactant. At least a part of the additive is also moved to the surface layer region. In such a case, the first layer contains such an additive. For example, there is a strong tendency to moving an additive having a low surface tension to the surface layer side and to allow the additive to exist in the surface layer region at a high concentration, and examples of such an additive include a compound having a silicon atom or a fluorine atom in a molecular structure. The amount of additive contained in the first layer is not particularly limited. Furthermore, the first layer may contain an organic solvent-soluble resin (the details thereof will be described below), but even in a case where the first layer contains the organic solvent-soluble resin, the content of the organic solvent-soluble resin in the first layer is less than the detection limit of the composition analysis using the RAMAN spectroscopy. Furthermore, the details of the additive and the polymerization treatment will be described below.

(Thickness of First Layer)

The thickness of the first layer is preferably greater than or equal to 0.5 µm, is more preferably greater than or equal to 1.0 µm, and is even more preferably greater than or equal to 3.0 µm, from the viewpoint of improving the abrasion resistance. On the other hand, thinning the hard coat film is preferable from the viewpoint of thinning a member (for example, a polarizing plate and an image display device) including the hard coat film as a protective film, for example. From this viewpoint, the thickness of the first layer is preferably less than or equal to 20.0 µm, is more preferably less than or equal to 15.0 µm, is even more preferably less than or equal to 10.0 µm, and is still more preferably less than or equal to 8.0 µm.

Second Layer

The second layer is a layer adjacent to the first layer in which the organic solvent-soluble resin and the polymer of the polymerizable composition containing at least one polyfunctional polymerizable compound described above are detected by the composition analysis using the RAMAN spectroscopy, and a thickness is greater than 15.0 µm.

(Thickness of Second Layer)

The thickness of the second layer is greater than 15.0 µm. The present inventors have assumed that the second layer which is a layer adjacent to the first layer contains the polymer described above and has a thickness of greater than 15.0 µm, and thus, contributes to the improvement in the adhesiveness between the first layer and the second layer. Further, the thickness of the second layer is preferably greater than or equal to 16.0 µm, and is more preferably greater than or equal to 20.0 µm, from the viewpoint of improving the adhesiveness. The upper limit is not particularly limited, and for example, is less than or equal to 500.0 µm. In addition, as described above, thinning the hard coat film is preferable from the viewpoint of thinning the member (for example, the polarizing plate and the image display device) including the hard coat film as a protective film, for example. From this viewpoint, the thickness of the second layer is preferably less than or equal to 300.0 µm, is more preferably less than or equal to 200.0 µm, is even more preferably less than or equal to 100.0 µm, and is still more preferably less than or equal to 60.0 µm. On the other hand, it is also preferable that the thickness of the second layer is greater than or equal to 100.0 µm from the viewpoint of the stiffness of the hard coat film.

(Polymer)

The polymer contained in the second layer is a polymer of a polymerizable composition containing at least one polyfunctional polymerizable compound having two or more polymerizable groups in one molecule. The polymer contained in the second layer may be a polymer having the same the constitutional unit as that of the polymer contained in the first layer, or may be a polymer having a constitutional unit of which a part is different from that of the polymer contained in the first layer. A polymer is preferable in which at least a part of a constitutional unit derived from the polyfunctional polymerizable compound which is contained as the constitutional unit is identical to that of the polymer contained in the first layer. The details of the polyfunctional polymerizable compound and the monofunctional polymerizable compound which are able to form the polymer contained in the second layer are as described with respect to the first layer.

The amount of polymer contained in the second layer is not limited to the following description, and in the quantification result of the composition analysis using the RAMAN spectroscopy, the amount of polymer contained in the second layer, for example, is greater than or equal to 5 mass % and less than or equal to 80 mass %. Furthermore, in the second layer, a polymer concentration has a concentration gradient in a thickness direction. For example, in the second layer, an embodiment in which the polymer concentration increases towards an interface between the first layer and the second layer at least continuously or intermittently, and the like are included in one embodiment of the present invention. In the quantification result described above, the amount of polymer in the second layer is preferably greater than or equal to 8 mass %, is more preferably greater than or equal to 10 mass %, and is even more preferably greater than or equal to 12 mass %, from the viewpoint of the adhesiveness between the first layer and the second layer. On the other hand, in a case where the amount of polymer contained in the second layer decreases, it is possible to relatively increase the content of the organic solvent-soluble resin of the second layer. It is preferable that the amount of organic solvent-soluble resin contained in the second layer increases from the viewpoint of the brittleness of the hard coat film. From this viewpoint, in the quantification result described above, the amount of polymer in the second layer, for example, is able to be less than or equal to 70 mass %, to be less than or equal to 60 mass %, to be less than or equal to 50 mass %, to be less than or equal to 40 mass %, and to be less than or equal to 30 mass %, or may be less than or equal to 20 mass %.

(Organic Solvent-Soluble Resin)

The organic solvent-soluble resin indicates a resin exhibiting organic solvent-solubility according to the definition described above. In the second layer, only one type of the organic solvent-soluble resin may be used, or two or more different types of organic solvent-soluble resins may be used by being mixed at an arbitrary ratio. The amount of organic solvent-soluble resin in the second layer is not limited to the following description, and in the quantification result of the composition analysis using the RAMAN spectroscopy, the amount of organic solvent-soluble resin in the second layer, for example, is greater than or equal to 5 mass % and less than or equal to 95 mass %. The amount of organic solvent-soluble resin in the second layer is preferably greater than or equal to 10 mass %, is more preferably greater than or equal to 20 mass %, is even more preferably greater than or equal to 30 mass %, and is still more preferably greater than or equal to 50 mass %, from the viewpoint of the brittleness of the hard coat film. On the other hand, it is preferable that the amount of polymer in the second layer described above increases from the viewpoint of the hardness of the hard coat film, and in a case where the amount of organic solvent-soluble resin contained in the second layer increases, the amount of polymer contained in the second layer described above relatively decreases. From this viewpoint, in the quantification result of the composition analysis using the RAMAN spectroscopy, the content of the organic solvent-soluble resin in the second layer is preferably less than or equal to 90 mass %, is more preferably less than or equal to 85 mass %, is even more preferably less than or equal to 80 mass %, and is still more preferably less than or equal to 70 mass %.

Examples of the organic solvent-soluble resin are able to include (i) cellulose acylate which has excellent transparency, and thus, is preferable as the material of the protective film of the image display device or the like. In addition, other examples of the organic solvent-soluble resin are able to include various thermoplastic resins which are generally used as the material of the base film of the hard coat film having a laminated structure, for example, (ii) a (meth) acrylic resin, (iii) a polycarbonate-based resin, (iv) a polystyrene-based resin, (v) a cyclic polyolefin resin, (vi) a glutaric anhydride-based resin, (vii) a glutarimide-based resin, and the like.

Hereinafter, a specific embodiment of the organic solvent-soluble resin described above will be described, but the present invention is not limited to the following embodiment. An organic solvent-soluble resin is able to be used without any limitation insofar as the organic solvent-soluble resin satisfies the definition described above.

(i) Cellulose Acylate

The cellulose acylate is not particularly limited. In the cellulose acylate, the details of an acyl group which substitutes for a hydroxyl group of cellulose can referred to paragraph 0017 of JP2012-215812A. An acetyl group, a propionyl group, and a butanoyl group are preferable, the acetyl group and the propionyl group are more preferable, and the acetyl group is even more preferable. The acetyl substitution degree of the cellulose acylate, for example, is able to be greater than or equal to 2.00, is preferably greater than or equal to 2.30, and is even more preferably greater than or equal to 2.40. Cellulose acylate having an acetyl substitution degree of less than or equal to 2.95 is preferable, cellulose acylate having an acetyl substitution degree of less than or equal to 2.90 is more preferable, cellulose acylate having an acetyl substitution degree of less than or equal to 2.89 is even more preferable, and cellulose acylate having an acetyl substitution degree of less than or equal to 2.80 is still more preferable, from the viewpoint of optical performance. In addition, in a case where the hard coat film is produced by casting film formation using the co-casting described below, the acetyl substitution degree of cellulose acylate contained in a composition for co-casting is preferably less than or equal to 2.75, and is more preferably less than or equal to 2.45, from the viewpoint of further improving the hardness of the hard coat film. From the same viewpoint, it is preferable that the total degree of substitution of acyl of the cellulose acylate is in the range of the acetyl substitution degree described above. Furthermore, the total degree of substitution of acyl and the acetyl substitution degree are able to be measured on the basis of a method defined in ASTM-D817-96. A portion which is not substituted with an acyl group generally exists as a hydroxyl group. In addition, the details of the cellulose acylate can be also referred to paragraphs 0018 to 0020 of JP2012-215812A.

(ii) (Meth)Acrylic Resin

The (meth)acrylic resin has a concept including both of a methacrylic resin and an acrylic resin. In addition, the (meth)acrylic resin also contains a copolymer of acrylate ester and methacrylate ester. The repeating structural unit of the (meth)acrylic resin is not particularly limited. It is preferable that the (meth)acrylic resin has a repeating structural unit derived from a (meth)acrylic acid ester monomer as a repeating structural unit.

The (meth)acrylic resin may further have a repeating structural unit which is able to be obtained by polymerizing at least one selected from a hydroxyl group-containing monomer, an unsaturated carboxylic acid, and a monomer denoted by General Formula (201) described below as a repeating structural unit.

$$CH_2=C(X)R^{201} \quad \text{General Formula (201)}$$

In General Formula (201), $R^{201}$ represents a hydrogen atom or a methyl group, X represents a hydrogen atom, an alkyl group having 1 to 20 carbon atoms, an aryl group, a —CN group, a —CO—$R^{202}$ group, or a O—CO—$R^{203}$ group, and $R^{202}$ and $R^{203}$ each independently represent a hydrogen atom or an organic residue having 1 to 20 carbon atoms.

The (meth)acrylic acid ester is not particularly limited. The details can be referred to paragraph 0034 of JP2013-099875A.

The hydroxyl group-containing monomer is not also particularly limited. The details can be referred to paragraph 0035 of JP2013-099875A.

The unsaturated carboxylic acid is not also particularly limited. The details can be referred to paragraph 0036 of JP2013-099875A.

The details of the monomer denoted by General Formula (201) can be referred to paragraph 0037 of JP2013-099875A.

The (meth)acrylic resin may have one or more lactone ring structures. Examples of one embodiment of the lactone ring structure are able to include a lactone ring structure denoted by General Formula (401) described below.

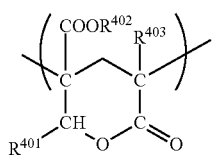

General Formula (401)

In General Formula (401), $R^{401}$, $R^{402}$, and $R^{403}$ each independently represent a hydrogen atom or an organic residue having 1 to 20 carbon atoms, and the organic residue may contain an oxygen atom. Here, a methyl group, an ethyl group, an isopropyl group, an n-butyl group, a t-butyl group, and the like are preferable as the organic residue having 1 to 20 carbon atoms.

The content ratio of the lactone ring structure denoted by General Formula (401) described above in the structure of a lactone ring-containing (meth)acrylic resin is preferably 5 mass % to 90 mass %, is more preferably 10 mass % to 70 mass %, is even more preferably 10 mass % to 60 mass %, and is particularly preferably 10 mass % to 50 mass %. By setting the content ratio of the lactone ring structure to be greater than or equal to 5 mass %, the heat resistance of the resin and the surface hardness tend to be improved, lactone and by setting the content ratio of the ring structure to be less than or equal to 90 mass %, the molding workability of the resin tends to be improved.

A production method of the lactone ring-containing (meth)acrylic resin is not particularly limited. For example, a polymer (p) having a hydroxyl group and an ester group in a molecular chain is obtained by a polymerization step, and then, a lactone ring structure is introduced into the polymer by performing a heat treatment with respect to the obtained polymer (p) (a lactone cyclocondensation step), and thus, a lactone ring-containing (meth)acrylic resin is able to be obtained. The details of preferred physical properties or the like of the lactone ring-containing (meth)acrylic resin can be referred to paragraphs 0040 to 0047 of JP2012-250535A.

In addition, it is preferable that a weight-average molecular weight Mw of the (meth)acrylic resin is greater than or equal to 80,000. In a case where the mass average molecular weight Mw of the (meth)acryl resin is greater than or equal to 80,000, mechanical strength is high, and handling aptitude at the time of producing the film is excellent. From this viewpoint, it is preferable that the weight-average molecular weight Mw of the (meth)acrylic resin is greater than or equal to 100,000. Furthermore, in the present invention, the average molecular weight is a value measured in terms of polystyrene by using a gel permeation chromatography (GPC) method.

A commercially available product or a (meth)acrylic resin synthesized by a known synthesis method is able to be used as the (meth)acrylic resin. Examples of the commercially available product include DELPET 60N and DELPET 80N (manufactured by Asahi Kasei Chemicals Corporation.), DIANAL BR80, DIANAL BR85, DIANAL BR88, and DIANAL BR102 (manufactured by Mitsubishi Rayon Co., Ltd.), KT75 (manufactured by Denka Company Limited), and the like, but the commercially available product is not limited thereto.

(iii) Polycarbonate-Based Resin

The polycarbonate-based resin is not particularly limited. For example, a commercially available product is able to be directly used, or the commercially available product is able to be used by being added with an additive in order to suitably control a peeling force or toughness. Specific examples of the commercially available product include PANLITE L-1225L, PANLITE L-1250Y, PANLITE K-1300Y, and PANLITE AD-5503 (manufactured by TEIJIN LIMITED.), NOVAREX 7020R, NOVAREX 7022R, NOVAREX 7025R, NOVAREX 7027R, and NOVAREX 7030R (manufactured by Mitsubishi Engineering-Plastics Corporation), and the like, but the commercially available product is not limited thereto.

(iv) Polystyrene-Based Resin

A commercially available product is able to be directly used as the polystyrene-based resin, or the commercially available product is able to be used by being added with an additive in order to suitably control a peeling force or toughness. In addition, a polystyrene-based resin in which polystyrene is copolymerized vinyl toluene, α-methyl styrene, acrylonitrile, methyl vinyl ketone, ethylene, propylene, acetate vinyl, maleic anhydride, and the like may be used in order to control physical properties. Specific examples of the commercially available product include PSJ POLYSTYRENE G9401, PSJ POLYSTYRENE G9305, and PSJ POLYSTYRENE SGP-10 (manufactured by PS Japan Corporation), HYBRANCH XC-540HB, HYBRANCH XC-520, DICSTYRENE CR-250, DICSTYRENE CR-350, and DICSTYRENE CR-450 (manufactured by DIC Corporation), CEVIAN N020SF, CEVIAN 050SF, CEVIAN 070SF, and CEVIAN 080SF (manufactured by Daicel Polymer Ltd.) as a styrene-acrylonitrile copolymer, XIRAN SZ28110, XIRAN SZ26180, XIRAN SZ26120, XIRAN SZ26080, XIRAN SZ23110, XIRAN SZ15170, and XIRAN SZ08250 (manufactured by Polyscope Polymers BV) as a styrene-maleic anhydride copolymer, and the like, but the commercially available product is not limited thereto.

(v) Cyclic Polyolefin Resin

The cyclic polyolefin resin indicates a resin having a cyclic olefin structure.

Examples of the resin having a cyclic olefin structure are able to include (1) a norbornene-based polymer, (2) a polymer of monocyclic cyclic olefin, (3) a polymer of cyclic conjugated diene, (4) a vinyl alicyclic hydrocarbon polymer, a hydride of (1) to (4), and the like. Examples of a more specific embodiment are able to include a cyclic polyolefin resin which is an addition (co)polymer having at least one repeating unit denoted by General Formula (II) described below, and as necessary, a cyclic polyolefin resin which is an addition (co)polymer further having at least one repeating unit denoted by General Formula (I). In addition, examples of a more specific embodiment are able to also include a ring opening (co)polymer having at least one cyclic repeating unit denoted by General Formula (III).

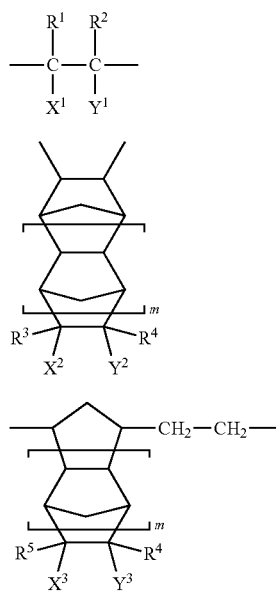

In General Formulas (I) to (III), m represents an integer in a range of 0 to 4. $R^1$ to $R^6$ each independently represent a hydrogen atom or a hydrocarbon group having 1 to 10 carbon atoms, and $X^1$ to $X^3$ and $Y^1$ to $Y^3$ each independently represent a hydrogen atom, a hydrocarbon group having 1 to 10 carbon atoms, a halogen atom, a hydrocarbon group having 1 to 10 carbon atoms substituted with a halogen atom, $-(CH_2)_nCOOR^{11}$, $-(CH_2)_nOCOR^{12}$, $-(CH_2)_nNCO$, $-(CH_2)_nNO_2$, $-(CH_2)_nCN$, $-(CH_2)_nCONR^{13}R^{14}$, $-(CH_2)_nNR^{13}R^{14}$, and $-(CH_2)_nOZ$, $-(CH_2)_nW$, or $(-CO)_2O$ and $(-CO)_2NR^{15}$ configured of $X^1$ and $Y^1$, $X^2$ and $Y^2$, or $X^3$ and $Y^3$. Furthermore, $R^{11}$, $R^{12}$, $R^{13}$, $R^{14}$, and $R^{15}$ each independently represent a hydrogen atom or a hydrocarbon group having 1 to 20 carbon atoms, Z represents a hydrocarbon group or a hydrocarbon group substituted with halogen, W represents $SiR^{16}_pD_{3-p}$ ($R^{16}$ represents a hydrocarbon group having 1 to 10 carbon atoms, D represents a halogen atom, $-OCOR^{16}$, or $OR^{16}$, and p represents an integer of 0 to 3), and n represents an integer in a range of 0 to 10. It is preferable that $R^5$ and $R^6$ each independently represent a hydrogen atom or $-CH_3$, and it is preferable that $X^3$ and $Y^3$ each independently represent a hydrogen atom, a chlorine atom, or $-COOCH_3$. It is preferable that other groups are suitably selected from the groups described above. ARTON G or ARTON F (manufactured by JSR Corporation, Product Name) is released as a commercially available product of the norbornene-based polymer. In addition, ZEONOR ZF14, ZF16, ZEONEX 250, or ZEONEX 280 (manufactured by Zeon Corporation, Product Name) is commercially available. The commercially available product is also able to be used as the norbornene-based polymer. The details of the norbornene-based polymer and the cyclic polyolefin resin can be referred to paragraphs 0032 and 0033 of JP2013-029792A.

(vi) Glutaric Anhydride-Based Resin

The glutaric anhydride-based resin indicates a resin which is a polymer having a glutaric anhydride unit. It is preferable that the polymer having a glutaric anhydride unit has a glutaric anhydride unit denoted by General Formula (101) described below (hereinafter, referred to as a glutaric anhydride unit).

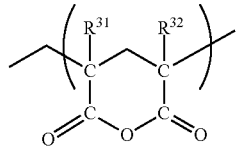

In General Formula (101), $R^{31}$ and $R^{32}$ each independently represent a hydrogen atom or an organic residue having 1 to 20 carbon atoms. Furthermore, the organic residue may contain an oxygen atom. It is preferable that $R^{31}$ and $R^{32}$ each independently represent a hydrogen atom or an alkyl group having 1 to 5 carbon atoms.

The details of the polymer having a glutaric anhydride unit can be referred to paragraphs 0052 to 0065 of JP2012-250535A.

(vii) Glutarimide-Based Resin

The glutarimide-based resin indicates a resin which is a polymer having a glutarimide unit.

The glutarimide-based resin is a thermoplastic resin having a substituted or unsubstituted imide group in a side chain. By having the substituted or unsubstituted imide group in the side chain, it is possible to exhibit a property balance which is preferable from the viewpoint of optical properties, heat resistance, and the like. It is preferable that the glutarimide-based resin has a glutarimide unit denoted by at least General Formula (301) described below.

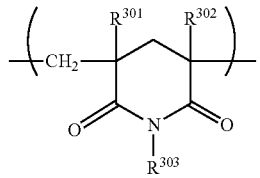

(In the formula, $R^{301}$, $R^{302}$, and $R^{303}$ each independently represent hydrogen or an substituted or unsubstituted alkyl group having 1 to 12 carbon atoms, a cycloalkyl group having 1 to 12 carbon atoms, and an aryl group having 1 to 12 carbon atoms.)

In a preferred glutarimide unit configuring the glutarimide-based resin, $R^{301}$ and $R^{302}$ each independently represent hydrogen or a methyl group, and $R^{303}$ represents a methyl group or a cyclohexyl group. One type of the glutarimide unit may be included in the resin, or plurality of types of glutarimide units having different $R^{301}$, $R^{302}$, and $R^{303}$ may be included in the resin.

It is preferable that an acrylic acid ester constitutional unit or a methacrylic acid ester constitutional unit such as methyl acrylate, ethyl acrylate, methyl methacrylate, and ethyl methacrylate is included in the glutarimide-based resin. Examples of another preferred constitutional unit include N-alkyl methacrylamide such as N-methyl methacrylamide or N-ethyl methacrylamide. Only one type of a constitutional unit other than the glutarimide unit may be independently included, or a plurality of types of constitutional units may be included.

It is preferable that the content of the glutarimide unit denoted by General Formula (301) in the glutarimide-based resin is in a range of 20 mass % to 95 mass % on the basis of the total repeating unit of the glutarimide-based resin, from the viewpoint of the heat resistance and the transparency. The content of glutarimide unit in the glutarimide-based resin is more preferably 50 mass % to 90 mass %, and is even more preferably 60 mass % to 80 mass %.

Other copolymerizable components can be referred to paragraph 0030 of JP2005-189623A. In addition, the details of a synthesis method of the glutarimide-based resin and the like can be referred to paragraph 0031 of JP2005-189623A. It is preferable that the weight-average molecular weight of the glutarimide-based resin is in a range of $1 \times 10^4$ to $5 \times 10^5$.

As described below, the composition for casting film formation is able to contain various additives such as a polymerization initiator, an ultraviolet absorbent, and a surfactant. The second layer is able to arbitrarily contain one or more types of additives. The amount of additive contained in the second layer is not particularly limited. The details of the additive are as described below.

In one embodiment, the hard coat film described above is configured of two layers of the first layer and the second layer as described above. FIG. 1A is a schematic sectional view of an example of such a hard coat film configured of two layers.

On the other hand, the hard film described above is able to include one or more other layers in addition to the first layer and the second layer. The first layer is a layer in which the polymer described above is detected by the composition analysis using the RAMAN spectroscopy as a main component. The present inventors have assumed that including a layer which contains such a polymer as a main component at a high concentration contributes to the improvement in the abrasion resistance of the hard coat film. Therefore, it is preferable that the first layer which is assumed to contribute to the improvement in the abrasion resistance exists as the outermost layer of the hard coat film. For this reason, it is preferable that the other layer is adjacent to the second layer on a side opposite to the first layer.

(Third Layer)

Examples of one embodiment of such other layers are able to include a layer (the third layer) in which polymer of a polymerizable composition containing at least one polyfunctional polymerizable compound having two or more polymerizable groups in one molecule is not detected and an organic solvent-soluble resin is detected as a main component by the composition analysis using the RAMAN spectroscopy. FIG. 1B is a schematic sectional view of an example of a hard coat film in which the first layer, the second layer, and the third layer are arranged to be adjacent to each other. The third layer is a layer which functions as a so-called base film (a support). It is preferable that the hard coat film includes the third layer hard coat from the viewpoint of enhancing the brittleness of the film.

The organic solvent-soluble resin contained in the third layer may be the same resin as the organic solvent-soluble resin contained in the second layer, or may be a different resin from the organic solvent-soluble resin contained in the second layer. Here, the same resin indicate that one or more constitutional units of the resins have the same structure (here, main chains may be identical to each other, and a case where substituent groups of side chains are different from each other is included), and the different resins indicate that the constitutional units of the resins do not have the same structure. In the same resins, the average molecular weights or the degrees of polymerization may be different from each other. It is preferable that the second layer and the third layer contain the same resin from the viewpoint of the adhesiveness between the second layer and the third layer. Examples of one preferred embodiment are able to include a hard coat film in which both of the second layer and the third layer contain cellulose acylate.

Only one type of the organic solvent-soluble resin may be independently contained in the third layer, or two or more different types of organic solvent-soluble resins may be contained in the third layer. The details of the organic solvent-soluble resin contained in the third layer are as described above. In the quantification result of the composition analysis using the RAMAN spectroscopy, the content of the organic solvent-soluble resin in the third layer is preferably greater than or equal to 80 mass %, is more preferably greater than or equal to 90 mass %, is even more preferably greater than or equal to 95 mass %, is still more preferably greater than or equal to 98 mass %, and may be 100 mass %.

The thickness of the third layer, for example, is 1.0 µm, or may be greater than or equal to 5.0 µm, but is not particularly limited. As described above, thinning the hard coat film is preferable from the viewpoint of thinning the member (for example, the polarizing plate and the image display device) including the hard coat film as a protective film, for example. From this viewpoint, the thickness of the third layer is preferably less than or equal to 80.0 µm, and is more preferably less than or equal to 70.0 µm. One or more types of various additives described below may be contained in the third layer at an arbitrary amount.

(Another First Layer)

The hard coat film described above is able to include the first layer adjacent to the second layer on both surfaces of the second layer. That is, one embodiment of the hard coat film described above is a hard coat film including the first layer, the second layer adjacent to the first layer, and another first layer adjacent to the second layer. A schematic sectional view of an example of such a hard coat film is illustrated in FIG. 1C. The details of the another first layer are identical to those of the first layer.

(Total Thickness of Hard Coat Film)

The hard coat film described above is a laminated film including the layers described above. The total thickness of the hard coat film, for example, is greater than or equal to 16.0 µm. In addition, the total thickness of the hard coat film, for example, is less than or equal to 300.0 μm, and is preferably less than or equal to 80.0 μm from the viewpoint of thinning the member (for example, the polarizing plate and the image display device) including the hard coat film as a protective film, for example. The total thickness of the hard coat film is able to be obtained by a known film thickness measurement method, for example, a film thickness measurement method using a stylus type film thickness meter. In a case where measurement is performed at a plurality of portions, the total thickness of the hard coat film is the arithmetic average value of a plurality of measured values. Alternatively, the total thickness of the hard coat film may be obtained by observing a sectional surface using various microscopes such as an optical microscope and a scanning type electron microscope (SEM). The details of the determination of the measurement portion or the like can be referred to the description with respect to the measurement of the thickness of each of the layers. In addition, the details of the determination of the measurement portion or the like can be also referred to examples described below.

[Method for Producing Hard Coat Film]

Another embodiment of the present invention relates to a method for producing the hard coat film described above includes forming a web by casting a composition (the composition for casting film formation) containing a polymerizable composition containing at least one polyfunctional polymerizable compound having two or more polymerizable groups in one molecule, and an organic solvent-soluble resin onto a support, and performing a polymerization treatment of the polymerizable compound with respect to the web, in which a web heat treatment of disposing a surface layer region which becomes the first layer by the polymerization treatment described above on at least one surface layer side of the web formed by the casting is further included.

Hereinafter, the production method described above will be described in more detail.

(Composition for Casting Film Formation)

The composition for casting film formation which is used in the production method described above contains a polymerizable composition containing at least one polyfunctional polymerizable compound having two or more polymerizable groups in one molecule, an organic solvent-soluble resin, and an organic solvent. The details of the polyfunctional polymerizable compound, other polymerizable compounds which are able to be arbitrarily contained, and the organic solvent-soluble resin are as described above.

In general, the organic solvent which is used in the casting film formation is able to be used as the organic solvent contained in the composition for casting film formation without any limitation. Examples of the organic solvent include a mixed solvent in which one type or two or more or three or more types of various organic solvents proposed with respect to the organic solvent-solubility are mixed at an arbitrary ratio, but the organic solvent is not limited thereto.

In addition, in one embodiment, examples of the organic solvent include ketones such as acetone, methyl ethyl ketone, cyclopentanone, and cyclohexanone, ethers such as tetrahydrofuran (THF), 1,4-dioxane, 1,3-dioxolane, and 1,2-dimethoxy ethane, esters such as methyl formate, ethyl formate, methyl acetate, ethyl acetate, amyl acetate, and γ-butyrolactone, methyl cellosolve, dimethyl imidazolinone, dimethyl formamide, dimethyl acetamide, acetonitrile, dimethyl sulfoxide, sulfolane, nitroethane, methylene chloride, acetoacetate methyl, and the like. The 1,3-dioxolane, THF, the methyl ethyl ketone, the acetone, methyl acetate, and methylene chloride are preferable. In a mixed solvent where two or more types of solvents are mixed, it is preferable that the organic solvent exemplified as described above is a main solvent which is contained at the most substantial ratio (for example, greater than or equal to 50 mass % and less than 99 mass % with respect to 100 mass % of the total amount of the mixed solvent).

Alcohol having 1 to 4 carbon atoms is preferable as the organic solvent (an auxiliary solvent) contained in the mixed solvent along with the main solvent. Examples of the alcohol having 1 to 4 carbon atoms carbon are able to include one type or two or more types of methanol, ethanol, 1-propanol, 2-propanol, 1-butanol, 2-butanol, 2-methyl-1-propanol, 2-methyl-2-propanol, and propylene glycol monomethyl ether. The auxiliary solvent is able to be contained in the mixed solvent, for example, at a ratio of greater than or equal to 1 mass % and less than 50 mass %, and preferably at a ratio of greater than or equal to 1 mass % and less than or equal to 40 mass %, with respect to 100 mass % of the total amount of the mixed solvent. Furthermore, in a case where cellulose acylate is used as the organic solvent-soluble resin, the cellulose acylate has a hydroxyl group or a functional group having hydrogen bonding properties, such as ester and ketone, and thus, it is preferable that the organic solvent contains alcohol at a ratio of 5 mass % to 30 mass %, more preferably at a ratio of 7 mass % to 25 mass %, and even more preferably at a ratio of 10 mass % to 20 mass %, with respect to 100 mass % of the total amount of the solvent since the web is easily peeled off from the support. Furthermore, the composition for casting film formation may contain a small amount of water in addition to the organic solvent. In a case where water is contained, the content of water, for example, is able to be 0.1 mass % to 5 mass %, is able to be preferably 0.1 mass % to 3 mass %, and is able to be more preferably 0.2 mass % to 2 mass %, with respect to 100 mass % of the total amount of the solvent.

The ratio of the total amount of the solvent to 100 mass % of the total amount of the composition for casting film formation, for example, is in a range of 60 mass % to 95 mass %, and is preferably in a range of 70 mass % to 85 mass %. The composition for casting film formation containing the solvent in the range described above is preferable since a change in the concentration and the composition or the eduction of the solid content due to the volatilization of the solvent does not occur, and a viscosity suitable for stable casting is able to be obtained.

The content of the organic solvent-soluble resin in the composition for casting film formation, for example, is in a range of 1 mass % to 40 mass %, with respect to 100 mass % of the total amount of the composition for casting film formation. The content of the organic solvent-soluble resin in the composition for casting film formation is preferably greater than or equal to 5 mass %, and is more preferably greater than or equal to 10 mass %, from the viewpoint of the easiness of the casting. In addition, the content of the organic solvent-soluble resin in the composition for casting film formation is preferably less than or equal to 35 mass %, and is more preferably less than or equal to 30 mass %, from the viewpoint of the easiness of liquid feeding for casting.

The details of the amount of polyfunctional polymerizable compound with respect to 100 mass % of the total amount of the polymerizable composition, and the amount of monofunctional polymerizable compound which is able to be arbitrarily contained are as described above. The amount of polymerizable compound in the composition for casting film formation is preferably greater than or equal to 10 mass %, is more preferably greater than or equal to 30 mass %, is more preferably greater than or equal to 50 mass %, and is even more preferably greater than or equal to 70 mass %, with respect to 100 mass % of the total amount of the organic solvent-soluble resin. In addition, the amount of polymerizable compound in the composition for casting film formation is preferably less than or equal to 300 mass %, and is more preferably less than or equal to 200 mass %, with respect to 100 mass % of the total amount of the organic solvent-soluble resin. It is preferable that the hard coat film is able to be obtained from the composition for casting film formation containing the polymerizable composition in the range described above from the viewpoint of enhancing the film hardness and the brittleness.

As described above, in the production method described above, the polymerization treatment is performed by allowing the polyfunctional polymerizable compound to unevenly exist in a web surface layer region, and thus, it is possible to form the first layer, and the another first layer which is able to be arbitrarily disposed. According to the studies of the present inventors, the polyfunctional polymerizable compound tends to easily unevenly exist in the surface layer region by heating the web, as the amount of polyfunctional polymerizable compound in the composition for casting film formation increases. From this viewpoint, in one embodiment, the amount of polyfunctional polymerizable compound in the composition for casting film formation is preferably greater than or equal to 5 mass %, is more preferably greater than or equal to 10 mass %, and is even more preferably greater than or equal to 15 mass %, with respect to 100 mass % of the total amount of the composition. In addition, the amount of polyfunctional polymerizable compound in the composition for casting film formation is preferably less than or equal to 40 mass %, is more preferably less than or equal to 35 mass %, and is even more preferably less than or equal to 30 mass %, with respect to 100 mass % of the total amount of the composition, from the viewpoint of solubility.

Various additives are able to be arbitrarily added to the composition for casting film formation in addition to the component described above. Specific examples of such an additive are able to include (i) an ultraviolet absorbent, (ii) a surfactant, and (iii) a polymerization initiator. Hereinafter, the details thereof will be described, but the additive which is able to be added to the composition for casting film formation is not limited thereto.

(i) Ultraviolet Absorbent

The ultraviolet absorbent is able to contribute the enhancement in the durability of the hard coat film. In particular, it is preferable that the hard coat film which is used as a surface protective film contains the ultraviolet absorbent. The added amount of the ultraviolet absorbent may be suitably set according to the type of ultraviolet absorbent or the like. For example, 1 part by mass to 10 parts by mass of the ultraviolet absorbent with respect to 100 parts by mass of the organic solvent-soluble resin is able to be added to the composition for casting film formation. The ultraviolet absorbent is not particularly limited. Various ultraviolet absorbents which are generally used in the hard coat film are able to be used. Furthermore, an ultraviolet ray in the present invention indicates light in a wavelength range of 200 nm to 400 nm. The ultraviolet absorbent, for example, absorbs an ultraviolet ray of less than or equal to 400 nm, and thus, it is possible to improve the durability of the hard coat film, and in particular, the transmittance of the hard coat film at a wavelength of 370 nm is preferably less than or equal to 10%, is more preferably less than or equal to 5%, and is even more preferably less than or equal to 2%, by containing the ultraviolet absorbent.

Examples of the ultraviolet absorbent include an oxy benzophenone-based compound, a benzotriazole-based compound, a salicylic acid ester-based compound, a benzophenone-based compound, a cyanoacrylate-based compound, a triazine-based compound, a nickel complex-based compound, an inorganic powder, and the like. The details of a specific example of the ultraviolet absorbent or the like can be referred to paragraphs 0109 to 0190 of JP2006-184874A. In addition, a polymeric ultraviolet absorbent is also able to be used, and for example, a polymer type ultraviolet absorbent disclosed in JP1994-148430A (JP-H06-148430A) is able to be used. An ultraviolet absorbent disclosed in paragraph 0054 of JP2012-215812A is also able to be used. In addition, an ultraviolet absorbent which is used in examples described below is one of preferred ultraviolet absorbents.

Furthermore, in a case where the polymerization treatment described below is performed by ultraviolet irradiation, an ultraviolet ray which is emitted for polymerization is absorbed by the ultraviolet absorbent, and thus, the reaction efficiency of the polymerization reaction decreases, and for this reason, in a case where the composition for casting film formation containing the ultraviolet absorbent is used, it is preferable that the polymerization treatment is performed by heating or light irradiation other than the ultraviolet irradiation.

(ii) Surfactant

The surfactant is not particularly limited, and a commercially available product or various surfactants which are able to be synthesized by a known method are able to be used. The surfactant is not limited to the following surfactants, and specific examples of the surfactant are able to include a silicone-based compound and a fluorine-based compound.

Preferred examples of the silicone-based compound include a silicone-based compound in which at least one of a terminal of a compound chain or a side chain having a plurality of dimethyl silyl oxy units as a repeating unit has a substituent group.

The compound chain having dimethyl silyl oxy as a repeating unit may have a structural unit other than the dimethyl silyl oxy may be included. The substituent groups may be identical to each other or different from each other, and it is preferable that a plurality of substituent groups are included. Preferred examples of the substituent group include an acryloyl group, a methacryloyl group, a vinyl group, an aryl group, a cinnamoyl group, an epoxy group, an oxetanyl group, a hydroxyl group, a fluoroalkyl group, a polyoxy alkylene group, a carboxyl group, an amino group, or a group including the groups described above. The molecular weight thereof is not particularly limited, but is preferably less than or equal to 100,000, is particularly preferably less than or equal to 50,000, and is most preferably 3,000 to 30,000. Here, the molecular weight indicates a weight-average molecular weight. The same applies to the fluorine-based compound described below. The content of silicone atoms in the silicone-based compound is not particularly limited, but is preferably greater than or equal to 18.0 mass %, is more preferably 25.0 mass % to 37.8 mass %, and is even more preferably 30.0 mass % to 37.0 mass %.

Preferred examples of the silicone-based compound include X-22-174DX, X-22-2426, X-22-164B, X22-164C, X-22-170DX, X-22-176D, and X-22-1821 (Product Names, manufactured by Shin-Etsu Chemical Co., Ltd.); FM-0725, FM-7725, DMS-U22, RMS-033, RMS-083, and UMS-182 (Product Names, manufactured by Chisso Corporation), and the like. However, the silicone-based compound is not limited thereto.

It is preferable that the fluorine-based compound is a compound having a fluoroalkyl group. The number of carbon atoms of the fluoroalkyl group is preferably 1 to 20, and is more preferably 1 to 10, and the fluoroalkyl group may have a straight chain (for example $-CF_2CF_3$, $-CH_2(CF_2)_4H$, $-CH_2(CF_2)_8CF_3$, $-CH_2CH_2(CF_2)_4H$, and the like), a branch structure (for example, $CH(CF_3)_2$, $CH_2CF(CF_3)_2$, $CH(CH_3)CF_2CF_3$, $CH(CH_3)(CF_2)_5CF_2H$, and the like), an alicyclic structure (preferably, a 5-membered ring or a 6-membered ring, for example, a perfluorocyclohexyl group, or a perfluorocyclopentyl group, an alkyl group substituted therewith, and the like). In addition, the fluoroalkyl group may have an ether bond (for example, $CH_2OCH_2CF_2CF_3$, $CH_2CH_2OCH_2C_4F_8H$, $CH_2CH_2OCH_2CH_2C_8F_{17}$, $CH_2CH_2OCF_2CF_2OCF_2CF_2H$, and the like). A plurality of fluoroalkyl groups may be included in the same molecule.

The fluorine-based compound may further have one or a plurality of substituent groups such as an acryloyl group, a methacryloyl group, a vinyl group, an aryl group, a cinnamoyl group, an epoxy group, an oxetanyl group, a hydroxyl group, a polyoxy alkylene group, a carboxyl group, and an amino group. In addition, the fluorine-based compound may be a polymer or an oligomer with a compound which does not have a fluorine atom, and the molecular weight thereof is not particularly limited. The content of fluorine atoms in the fluorine-based compound is not particularly limited, but is preferably greater than or equal to 20 mass %, is more preferably 30 mass % to 70 mass %, and is even more preferably 40 mass % to 70 mass %.

Preferred examples of the fluorine-based compound are able to include R-2020, M-2020, R-3833, and M-3833 (Product Names, manufactured by DAIKIN INDUSTRIES, LTD.); MEGAFACE F-784, MEGAFACE F-171, MEGAFACE F-172, MEGAFACE F-179A, MEGAFACE F-114, MEGAFACE F-251, MEGAFACE F-281, MEGAFACE F-410, MEGAFACE F-430, MEGAFACE F-444, MEGAFACE F-477, MEGAFACE F-510, MEGAFACE F-511, MEGAFACE F-552, MEGAFACE F-553, MEGAFACE F-554, MEGAFACE F-555, MEGAFACE F-556, MEGAFACE F-557, MEGAFACE F-558, MEGAFACE F-559, MEGAFACE F-560, MEGAFACE F-561, MEGAFACE F-562, MEGAFACE F-563, MEGAFACE F-567, MEGAFACE F-569, MEGAFACE F-570, MEGAFACE F-571, MEGAFACE R-40, MEGAFACE R-41, MEGAFACE R-43, MEGAFACE R-94, MEGAFACE RS-72-K, MEGAFACE RS-76-E, MEGAFACE RS-76-NS, MEGAFACE RS-90, and DEFENSA MCF-300 (Product Names, manufactured by DIC Corporation), and the like.

The present inventors have considered that the surfactant contributes to the obtainment of a hard coat film having excellent surface smoothness. This is because the surfactant is assumed to exhibit levelability.

In addition, in order to provide properties such as dust prevention properties and antistatic properties, a dust prevention agent, an antistatic agent, and the like, such as a known cationic surfactant or a polyoxy alkylene-based compound are able to be suitably added. The structural unit of the dust prevention agent and the antistatic agent may be included in the silicone-based compound or the fluorine-based compound described above. Preferred examples of the compound include MEGAFACE F-150 manufactured by DIC Corporation; SH-3748 manufactured by Dow Corning Corporation, and the like, but the compound is not limited thereto.

Only one type of the surfactant may be independently used, or two or more types thereof may be used by being combined at an arbitrary ratio. The amount of surfactant in the composition for casting film formation is not particularly limited, and for example, is able to be 0.001 parts by mass to 10 parts by mass with respect to 100 parts by mass of the solid content in the composition for casting film formation.

(iii) Polymerization Initiator

The polymerization initiator may be a radical polymerization initiator or a cationic polymerization initiator. A suitable polymerization initiator may be selected according to the type of polymerizable compound to be used in combination. As described above, a radically polymerizable group is preferable as a polymerizable group of the polymerizable compound, and thus, it is preferable that the radical polymerization initiator is used. In addition, either a thermal polymerization initiator or a photopolymerization initiator may be selected as the polymerization initiator according to the type of polymerization treatment (heating and light irradiation) which is performed in a production step of the hard coat film. Furthermore, the polymerizable group of the polymerizable compound may function as an initiator which generates radicals by performing the polymerization treatment. In such a case, it is possible to allow the polymerization reaction of the polymerizable compound to progress without adding the polymerization initiator to the composition for casting film formation.

The structure of the thermal polymerization initiator is not particularly limited. Examples of a specific embodiment of the thermal polymerization initiator are able to include an azo compound, a hydroxyl amine ester compound, an organic peroxide, hydrogen peroxide, and the like. Specific examples of the organic peroxide are able to include an organic peroxide disclosed in paragraph 0031 of JP5341155B.

The azo compound may have at least one azo bond, and is able to have various substituent groups along with the azo bond. Specifically, an azonitrile compound such as 2,2'-azobisisobutyronitrile, 2,2'-azobis(2-methyl isobutyronitrile), 1,1'-azobis(cyclohexane-1-carbonitrile), and 1-[(1-cyano-1-methyl ethyl)azo]formamide, an azoester compound such as dimethyl 2,2'-azobis(2-methyl propionate) and dimethyl 1,1'-azobis(1-cyclohexane carboxylate), an azoamide compound such as 2,2'-azobis[N-(2-propenyl)-2-methyl propionamide], 2,2'-azobis(N-butyl-2-methyl propionamide), and 2,2'-azobis(N-cyclohexyl-2-methyl propionamide), an azoimidazoline compound such as 2,2'-azobis[2-[1-(2-hydroxy ethyl)-2-imidazolin-2-yl] propane]dihydroxy chloride and 2,2'-azobis[2-(2-imidazolin-2-yl) propane], and an azoalkyl compound such as 2,2'-azobis(2,4,4-trimethyl pentane), and an azoamidine compound and a polymer having a repeating unit which has an azo bond are also able to be used. The azo compound is a preferred thermal polymerization initiator from the viewpoint of rare occurrence of redox decomposition or induced decomposition, and the like.

In addition, examples of the hydroxyl amine ester compound are able to include a hydroxyl amine ester compound denoted by Formula I which is disclosed in JP2012-521573A. Specific compounds will be described below. However, the compound is not limited thereto.

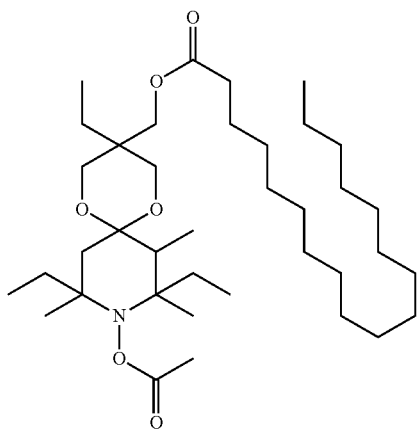
(H-1)
(H-2)
(H-3)
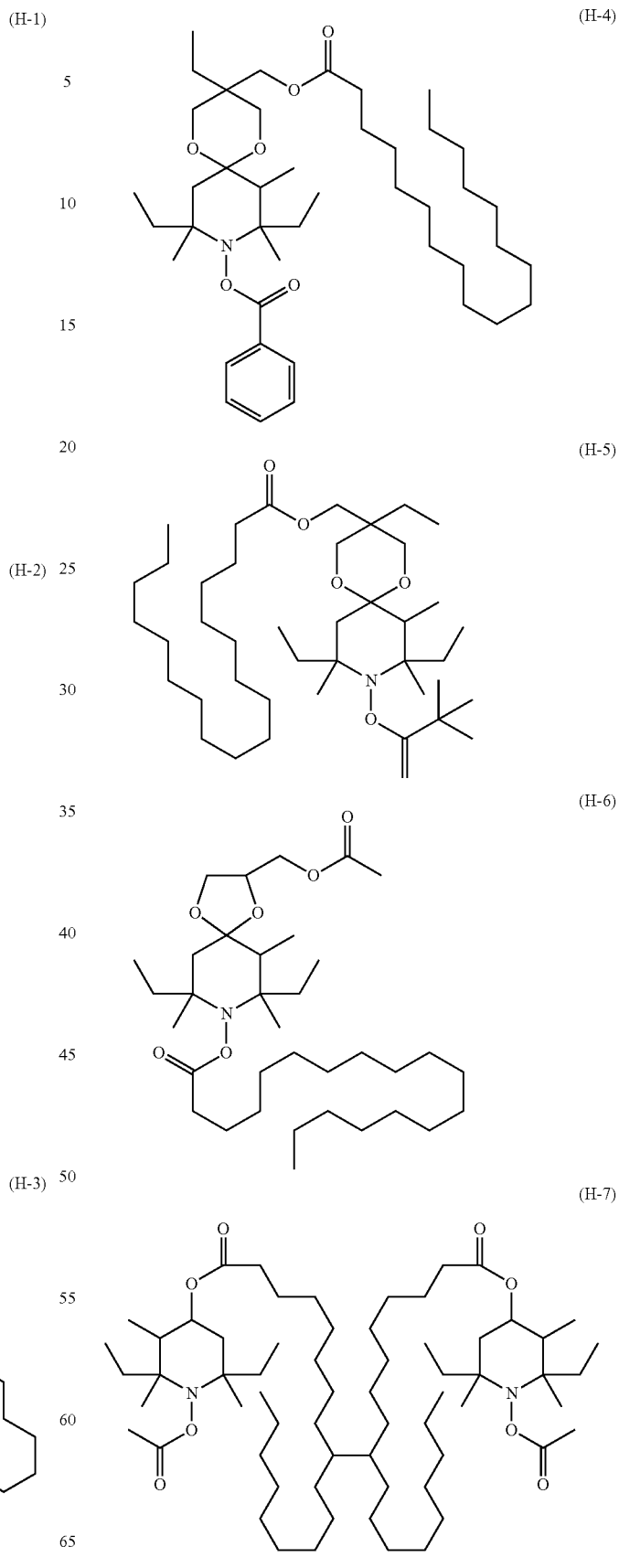
(H-4)
(H-5)
(H-6)
(H-7)

The photopolymerization initiator is not also particularly limited. Examples of the photopolymerization initiator include acetophenones, benzoins, benzophenones, phosphine oxides, ketals, anthraquinones, thioxanthones, an azo compound, peroxides, 2,3-dialkyl dione compounds, disulfide compounds, fluoroamine compounds, and aromatic sulfoniums. Examples of the acetophenones include 2,2-diethoxy acetophenone, p-dimethyl acetophenone, 1-hydroxy dimethyl phenyl ketone, 1-hydroxy cyclohexyl phenyl ketone, 2-methyl-4-methylthio-2-morpholinopropiophenone, and 2-benzyl-2-dimethyl amino-1-(4-morpholinophenyl)-butanone. Examples of the benzoins include benzoin benzene sulfonic acid ester, benzoin toluene sulfonic acid ester, benzoin methyl ether, benzoin ethyl ether, and benzoin isopropyl ether. Examples of the benzophenones include benzophenone, 2,4-dichlorobenzophenone, 4,4-dichlorobenzophenone, and p-chlorobenzophenone. Examples of the phosphine oxides include 2,4,6-trimethyl benzoyl diphenyl phosphine oxide.

Examples of various photopolymerization initiators are disclosed in the latest UV curing technology (P. 159, Publisher; Kazuhiro TAKASUKI, Publishing Office; TECHNICAL INFORMATION INSTITUTE CO., LTD., Published in 1991), and the various photopolymerization initiators are also able to be used.

Preferred examples of a commercially available optically cleavable photoradical polymerization initiator include IRGACURE series manufactured by BASF SE (IRGOXE01, IRG127, IRG651, IRG184, IRG819, and IRG907) and the like.

In addition, a compound having a surfactant action and a photopolymerization initiation action is also able to be used as the photopolymerization initiator. Examples of such a compound are able to include a compound which is disclosed in JP2009-035642A as a surfactant photopolymerization initiator (D). The details thereof can be referred to paragraphs 0077 to 0094 of JP2009-035642A.

Only one type of the polymerization initiator as described above may be independently used, or two or more types thereof may be used by being combined at an arbitrary ratio. The content of the polymerization initiator is preferably greater than or equal to 0.1 parts by mass, is more preferably greater than or equal to 0.5 parts by mass, and is further preferably greater than or equal to 1 part by mass, with respect to 100 parts by mass of the polymerizable composition, from the viewpoint of allowing the polymerization reaction to excellently progress. In addition, the used amount of the polymerization initiator is preferably less than or equal to 30 parts by mass, is more preferably less than or equal to 25 parts by mass, and is even more preferably less than or equal to 20 parts by mass, with respect to 100 parts by mass of the polymerizable composition, from the viewpoint of the transparency of the hard coat film, and the like.

It is considered that a polymerization initiator (for example, a compound containing a silicon atom or a fluorine atom in a molecular structure) having a low surface tension is moved to the surface layer side, and strongly tends to unevenly exist in the film surface layer region. The present inventors have assumed that two or more types of polymerization initiators having different surface tensions are used in combination by using the polymerization initiator having a low surface tension, and thus, the ratio of the polymerization initiator contained in the surface layer region which becomes the first layer by the polymerization treatment, and an internal region adjacent to the surface layer region (a region which becomes the second layer by the polymerization treatment) is adjusted, and the hardness, the brittleness, the transparency, and the like of the first layer and the second layer are able to be controlled.

The composition for casting film formation is able to be prepared by mixing the components described above simultaneously or in an arbitrary procedure. A preparation method is not particularly limited, and a known technology with respect to casting film formation is able to be applied without any limitation.

(Composition for Co-Casting)

The composition for casting film formation described above may be subjected to casting film formation by using only this composition. Alternatively, the composition for casting film formation described above may be co-cast along with other compositions (the composition for co-casting). Furthermore, the following description is an assumption of the present inventors, and the present invention is not limited by the assumption, but the present inventors have assumed that the reason that a hard coat film including at least the first layer and the second layer described above is able to be obtained by the production method according to one embodiment of the present invention is as follow.

The present inventors have considered that the reason that the polyfunctional polymerizable compound is able to unevenly exist in the surface layer region at a concentration higher than that of the internal region by heating the web which is obtained by performing the casting film formation with respect to the composition for casting film formation described above is because a solvent is evaporated from a web surface by heating, and the amount of solvent in the surface layer region is less than that in the internal region, and thus, phase separation between the polyfunctional polymerizable compound and the organic solvent-soluble resin which are mixed into the web preferentially occurs in the surface layer region. Here, it is considered that the phase separation due to heating preferentially occurs on both surface layer sides in the web which is obtained by performing the casting film formation with respect to the composition for casting film formation described above. As a result thereof, the present inventors have assumed that it is possible to obtain a hard coat film including the first layer on one surface of the second layer, and the another first layer on the other surface.

On the other hand, the present inventors have considered that in the web which is obtained by co-casting the composition for casting film formation described above along with other compositions, the polyfunctional polymerizable compound unevenly exists due to the phase separation in the surface layer region on a surface side which is not adjacent to a coated film formed of other compositions.

From the viewpoint described above, in order to obtain a hard coat film configured of two layers of the first layer and the second layer, and a hard coat film configured of three layers of the first layer, the second layer, and the third layer, it is preferable that the composition for casting film formation described above is co-cast along with the other composition in the casting film formation. More preferably, in order to obtain the hard coat film configured of two layers of the first layer and the second layer, and the hard coat film configured of three layers of the first layer, the second layer, and the third layer, a composition which contains the organic solvent-soluble resin and does not contain the polyfunctional polymerizable compound is able to be used as the composition for co-casting. In a case where such a composition is used as the composition for co-casting, it is considered that the component is able to be moved to a coated film formed of the composition for co-casting from a coated film formed of the composition for casting film formation described above in the web, but a region in which the polyfunctional polymerizable compound unevenly exists at a concentration as high as the concentration on a surface layer side of the coated film formed of the composition for casting film formation described above is not formed on a surface layer side of the coated film formed of the composition for co-casting. Thus, the present inventors have assumed that the hard coat film configured of two layers of the first layer and the second layer, and the hard coat film configured of three layers of the first layer, the second layer, and the third layer are able to be obtained.

The above description with respect to the composition for casting film formation is able to be applied as the details of the composition for co-casting except that it is preferable not to contain the polyfunctional polymerizable compound. In particular, (i) the cellulose acylate, (ii) the (meth)acrylic resin, (iii) the polycarbonate-based resin, (iv) the polystyrene-based resin, (v) the cyclic polyolefin resin, (vi) the glutaric anhydride-based resin, and (vii) the glutarimide-based resin described above are able to be preferably used as the organic solvent-soluble resin contained in the composition for co-casting. Cellulose acylate which has excellent transparency, and thus, is preferable as material of a protective film of an image display device or the like is preferably used as an example.

(Film Formation of Hard Coat Film Using Casting Film Formation Method)

Next, a specific embodiment of producing a hard coat film by using a casting film formation method will be described with reference to the drawings. However, the specific embodiment described below is merely an example, and the present invention is not limited to the specific embodiment described below.

Figure 2:
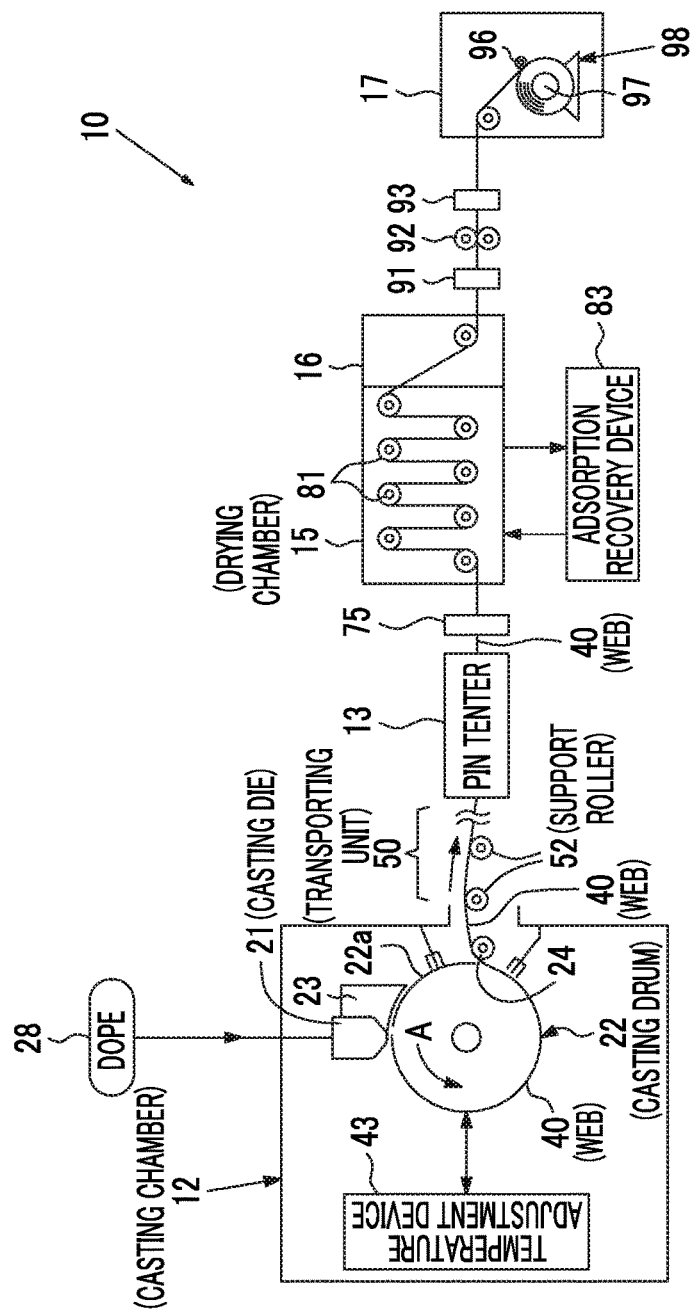
FIG. 2 is an explanatory diagram of an example of a solution casting film formation device (a casting support: a drum).

In the casting film formation method, a web is formed by casting a composition (a dope) onto a travelling support, and various treatments such as a heat treatment and a polymerization treatment are performed while travelling the formed web, and thus, a hard coat film is able to be formed. An example of a device using a drum as a casting support which is able to be used in such a casting film formation method is illustrated in FIG. 2. A solution casting film formation device 10 illustrated in FIG. 2 includes a casting chamber 12, a pin tenter 13, a drying chamber (a heating chamber) 15, a cooling chamber 16, and a winding chamber 17. A casting die 21, a casting drum 22, a reduced pressure chamber 23, and a peeling roller 24 are disposed in the casting chamber 12.

Figure 3:
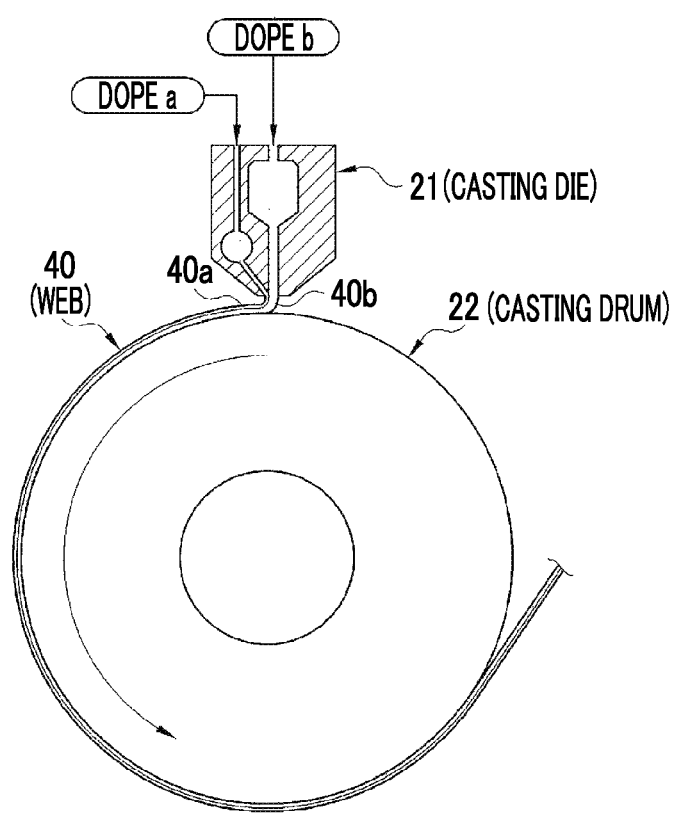
FIG. 3 is a partially enlarged view of a solution casting film formation device including a casting die in which co-casting is able to be performed.

The casting die 21 allows a dope 28 to flow out, and an slit outlet through which the dope 28 flows out is disposed on the distal end of the casting die 21. In a case where two types of dopes (the composition for casting film formation and the composition for co-casting) are used, a casting die in which a first flow path through which the supplied composition for casting film formation flows, a second flow path through which the supplied composition for co-casting flows, and a co-flow path through which the first flow path and the second flow path are confluent in a confluent position, and the two types of compositions described above flow concurrently are formed is used as the casting die 21. The two types of compositions described above are independently supplied from different supply ports, and both of the compositions are confluent in the casting die 21 and flow out from the casting die 21. FIG. 3 is a partially enlarged view of a casting device including the casting die 21 by which such co-casting is able to be performed. As illustrated in FIG. 3, the flow of a dope a and the flow of a dope b are confluent in the casting die 21, and then, flow out onto the casting drum 22 which travels from a discharge port of the distal end, and thus, a web 40 is formed as a laminate of a cast film 40a derived from the dope a and a cast film 40b derived from the dope b. Either the composition for casting film formation or the composition for co-casting described above may be the dope a or the dope b.

The casting drum 22 is positioned under the casting die 21, and is arranged such that an axis direction thereof is in a horizontal direction. Then, the casting drum 22 is arranged such that a peripheral surface 22a thereof is close to the slit outlet. Further, the casting drum 22 is able to be rotated around the axis. In a case where the casting drum 22 is rotated by a drive unit (not illustrated) under the control of a control unit (not illustrated), the peripheral surface 22a of the casting drum 22 travels in an A direction at a predetermined speed. The dope 28 which flows out from the slit outlet of the casting die 21 is stretched on the peripheral surface 22a, and thus, a strip-like web 40 is formed. It is preferable that the casting die 21 and the casting drum 22 are formed of stainless steel, and it is more preferable that the casting die 21 and the casting drum 22 are formed of SUS316 from the viewpoint of having sufficient corrosion resistance and sufficient strength.

A temperature adjustment device 43 is connected to the casting drum 22. The temperature adjustment device 43 includes a temperature adjustment unit adjusting the temperature of a heat-transmitting medium therein. The temperature adjustment device 43 circulates the heat-transmitting medium which is adjusted to have a desired temperature between the temperature adjustment unit and a flow path disposed in the casting drum 22. By circulating the heat-transmitting medium, it is possible to retain the temperature of the peripheral surface 22a of the casting drum 22 at a desired temperature. In addition, even though the illustration is omitted, a condensation device condensing a solvent contained in the atmosphere of the casting chamber 12 and a recovery device recovering the condensed solvent are disposed, and thus, it is possible to retain the concentration of the solvent contained in the atmosphere of the casting chamber 12 in a constant range. In addition, in order to blow air to the web 40 on the casting drum 22, an air blowing mechanism (not illustrated) capable of blowing hot air, cold air, and dehumidified air of which the temperature and the humidity are arbitrarily controlled may be disposed in the casting chamber 12.

The reduced pressure chamber 23 is arranged on the upstream side from the casting die 21 in the A direction. The reduced pressure chamber 23 suctions gas on the upstream side of a casting bead which is formed of the dope 28 from the slit outlet towards the peripheral surface 22a under the control of the control unit. Accordingly, it is possible to set the pressure on the upstream side of the casting bead to be lower than the pressure on the downstream side of the casting bead. It is preferable that a pressure difference between the upstream side and the downstream side of the casting bead is greater than or equal to 10 Pa and less than or equal to 2,000 Pa.

Figure 4:
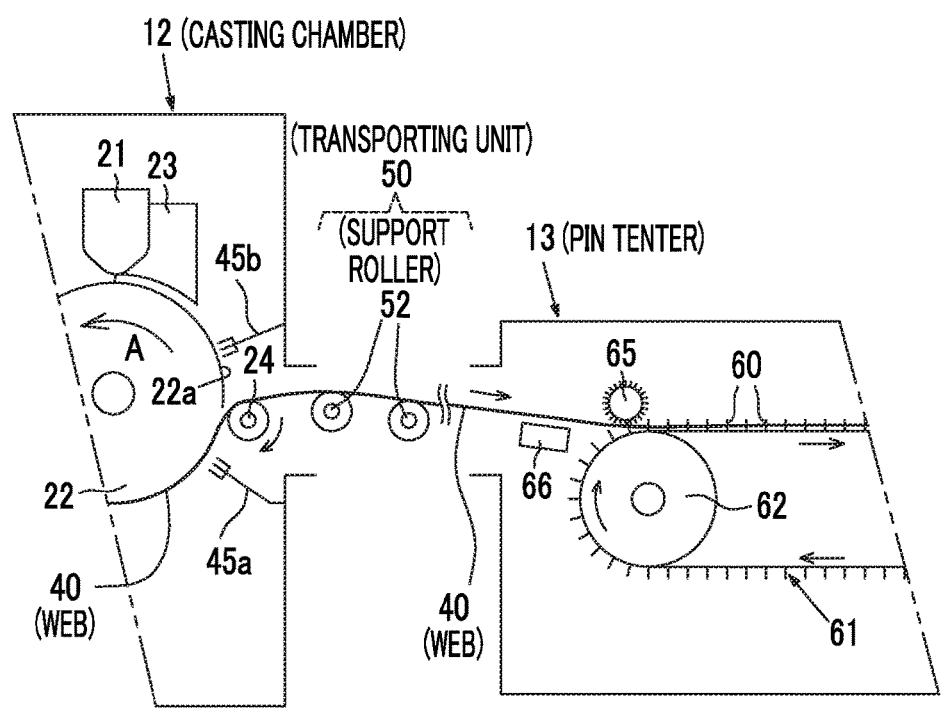
FIG. 4 is a side view illustrating an outline of a casting chamber, a pin tenter, and a transporting unit therebetween.

As illustrated in FIG. 4, the peeling roller 24 is arranged on the downstream side from the casting die 21 in the A direction. The peeling roller 24 peels off the web 40 formed on the peripheral surface 22a, and guides the peeled web 40 to the downstream side of the casting chamber 12.

A labyrinth seal 45a is disposed on the upstream side from the peeling roller 24 in the A direction, and a labyrinth seal 45b is disposed on the downstream side from the peeling roller 24 in the A direction. The labyrinth seals 45a and 45b are formed to be stretched from the inner wall surface of the casting chamber 12 towards the peripheral surface 22a of the casting drum 22. The distal ends of the labyrinth seals 45a and 45b are close to the peripheral surface 22a, and thus, it is possible to prevent the solvent from being leaked to the outside of the casting chamber 12.

As illustrated in FIG. 2, the pin tenter 13, the drying chamber 15, the cooling chamber 16, and the winding chamber 17 are disposed on the downstream of the casting chamber 12 in this order. A plurality of support rollers 52 supporting the web 40 are arranged in a transporting unit 50 between the casting chamber 12 and the pin tenter 13. The support roller 52 is rotated around the axis by a motor (not illustrated). The support roller 52 supports the web 40 delivered from the casting chamber 12, and guides the web 40 to the pin tenter 13. Furthermore, a case where two support rollers 52 are arranged in the transporting unit 50 is illustrated in the drawing, but the present invention is not limited thereto, and three or more support rollers 52 may be arranged in the transporting unit 50.

As illustrated in FIG. 4, the pin tenter 13 includes a cyclic retaining member 61 including a plurality of pins 60 which retain both ends of the web 40 in a width direction by passing therethrough, a pulley 62 allowing the retaining device 61 to circulate and travel, and a dry air supply machine (not illustrated) supplying dry air to the web 40 retained by the pin plate. A brush 65 allowing the both ends of the web 40 in the width direction to be engaged into the pin 60 is disposed on the inlet of the pin tenter 13. In addition, a cold air supply machine 66 supplying cold air to the both ends of the web 40 in the width direction may be disposed on the upstream side of a transport direction from the brush 65. The pin 60 passes through the both ends of the web 40 in the width direction by the pressurization of the brush 65. Then, the web 40 of which the both ends are retained by the pin 60 is transported by the circulation and travel of the retaining member 61.

An edge cutting device 75 is disposed between the pin tenter 13 and the drying chamber 15. A penetration trace formed by the pin 60 is formed on the both ends of the web 40 in the width direction which is delivered to the edge cutting device 75. The edge cutting device 75 separates both end portions having the penetration trace. The separated portions are sequentially fed to a cut blower (not illustrated) and a crusher (not illustrated) by air blowing, are finely cut, and are reused as a raw material of the dope or the like, or are discarded.

A plurality of rollers 81 are disposed on the drying chamber 15, and the web 40 is transported by being wound around the roller 81. The temperature, the humidity, or the like in the atmosphere in the drying chamber 15 or the cooling chamber 16 is adjusted by an air conditioner (not illustrated). In the drying chamber 15, the web 40 is subjected to a drying treatment. An adsorption recovery device 83 is connected to the drying chamber 15. The adsorption recovery device 83 recovers the solvent evaporated from the web 40 by adsorption.

As described above, the web 40 is subjected to the drying treatment in the drying chamber 15. In addition, the drying treatment is also performed in one or both of the casting chamber 12 and the pin tenter 13. It is possible to allow the polyfunctional polymerizable compound to unevenly exist in the web surface layer region by heating of the drying treatment. It is preferable that the surface layer region in which the polyfunctional polymerizable compound exists at a high concentration is an air interface side of the coated film formed of the composition for casting film formation described above. Both surfaces of the coated film obtained by casting only the composition for casting film formation described above become the air interface side, and thus, it is possible to allow the polyfunctional polymerizable compound to unevenly exist in both surface layer regions. Here, a phenomenon in which the polyfunctional polymerizable compound is leached onto the dried web surface, and thus, the web surface is in a wet state may be observed. It is preferable that a heat treatment heating the web at a heating temperature in a range of 50° C. to 200° C. for 2 minutes to 200 minutes is included in the production step from the viewpoint of forming the first layer which is effective for improving the abrasion resistance. Furthermore, the heating temperature in the present invention indicates the temperature of the web to be heated. In addition, the web may be heated while travelling, or may be heated in a stopped state. In general, the web is heated while travelling from the viewpoint of productivity.

In a case where the polymerization treatment of the polymerizable compound is performed by heating (thermal polymerization), the drying chamber 15 is also able to function as a heating chamber in which a heat treatment for performing the thermal polymerization is performed. A phenomenon in which the polyfunctional polymerizable compound unevenly exists in the web surface layer region may continuously progress with a thermal polymerization reaction, or the thermal polymerization reaction may progress after the polyfunctional polymerizable compound unevenly exists in the web surface layer region. In the former case, the heat treatment is able to be performed by an one-step heat treatment in which the temperature of the web rises to a predetermined heating temperature range, and then, the temperature of the web is retained in the heating temperature range for a predetermined period of time. In contrast, in the latter case, the heat treatment is able to be performed by a two-step heat treatment in which the temperature of the web rises to a predetermined first heating temperature range, the temperature of the web is retained in the first heating temperature range for a predetermined period of time, and then, the temperature of the web rises to a second heating temperature range which is a higher temperature, and the temperature of the web is retained in the second heating temperature range for a predetermined period of time. The former case is preferable from the viewpoint of simplifying the step, and the latter case is preferable from the viewpoint of forming a comparatively thick first layer. Furthermore, the heating to a predetermined temperature range may be continuously performed or may be gradually performed. A temperature rising rate is not particularly limited. The heating conditions for a polymerization treatment are not particularly limited insofar as the heating conditions are set according to the type of polymerizable compound or the type of polymerization initiator. As an example, the heat treatment for allowing the thermal polymerization reaction to progress is able to be performed by heating the web at a heating temperature of 140° C. to 200° C. for 2 minutes to 200 minutes. Here, it is preferable that the temperature is set to be the heating temperature of the heat treatment for allowing the polyfunctional polymerizable compound to unevenly exist in the surface layer region or to be higher than the heating temperature from the viewpoint of forming the first layer. Furthermore, the temperature of the web in the heat treatment is able to be monitored by a noncontact thermometer. The heating in the drying chamber 15 may be performed by blowing hot air, or may be performed by controlling the atmosphere temperature of the drying chamber. It is preferable that the polymerization treatment is performed by the thermal polymerization since the polymerization treatment is able to be performed along with the drying step from the viewpoint of simplifying the step.

The web 40 carried out from the drying chamber 15 is transported to the cooling chamber 16. Furthermore, it is not essential to dispose the cooling chamber. The cooling chamber 16 cools the web 40 until the temperature of the web 40 becomes approximately room temperature. A destaticizing bar 91, a knurling imparting roller 92, and an edge cutting device 93 are sequentially disposed between the cooling chamber 16 and the winding chamber 17 from the upstream side. The destaticizing bar 91 is delivered from the cooling chamber 16, and electricity is removed from the electrically charged web 40, and thus, a destaticizing treatment is performed. The knurling imparting roller 92 imparts winding knurling to the both ends of the web 40 in the width direction. The edge cutting device 93 cuts the both ends of the web 40 in the width direction such that knurling remains on both ends of a film 70 after being cut in the width direction.

In a case where a polymerization treatment (photopolymerization) is performed by light irradiation, effective treatment is able to be performed by arranging a light source in an arbitrary position between the drying chamber 15 and the winding chamber 17, and by performing light irradiation with respect to the web 40. A UV light source which is able to emit an ultraviolet ray is able to be used as the light source, but the light source is not particularly limited. Specific examples of the light source are able to include a low pressure mercury lamp, an intermediate pressure mercury lamp, a high pressure mercury lamp, an ultra high pressure mercury lamp, a xenone lamp, a carbon arc, a metal halide lamp, a solar ray, and the like. In addition, the light irradiation conditions are not also particularly limited, and may be determined according to the type of polymerizable compound or the type of polymerization initiator. Photopolymerization using ultraviolet irradiation, for example, is able to be performed in air or in inert gas. In a case where a polymerizable compound having an ethylenically unsaturated bond is used, it is preferable that the polymerization treatment is performed in the atmosphere where an oxygen concentration is low in order to shorten the induction period of the polymerization. For example, it is possible to set the irradiation strength of the ultraviolet ray to be emitted to be approximately 1 mW/cm$^2$ to 1,000 mW/cm$^2$, and it is possible to set the irradiation dose to be approximately 10 mJ/cm$^2$ to 2,000 mJ/cm$^2$.

A press roller 96 and a winding machine 98 including a winding core 97 are disposed in the winding chamber 17, and the web 40 fed to the winding chamber 17 is wound around the winding core 97 while being pressed by the press roller 96, and thus, the web 40 is formed into the shape of a roll.

Other details of one embodiment of the solution casting film formation method can be referred to JP2011-178043A. Furthermore, in the above description, the embodiment using the drum as the casting support has been described as an example, but the casting support is not limited to the drum. For example, a belt which is supported by at least two backup rollers and is transported in a longitudinal direction may be used as the casting support instead of the drum. In general, in a case of a so-called cooling and casting method in which gelation is performed by cooling a cast film, the casting support is usually set to the drum. In contrast, in a case of a so-called drying and casting method in which gelation is accelerated only by a drying treatment without cooling the cast film, the casting support is usually set to the belt.

Next, an embodiment using the belt as the casting support will be described on the basis of specific embodiments. However, the present invention is not limited to the specific embodiments described below.

Figure 5:
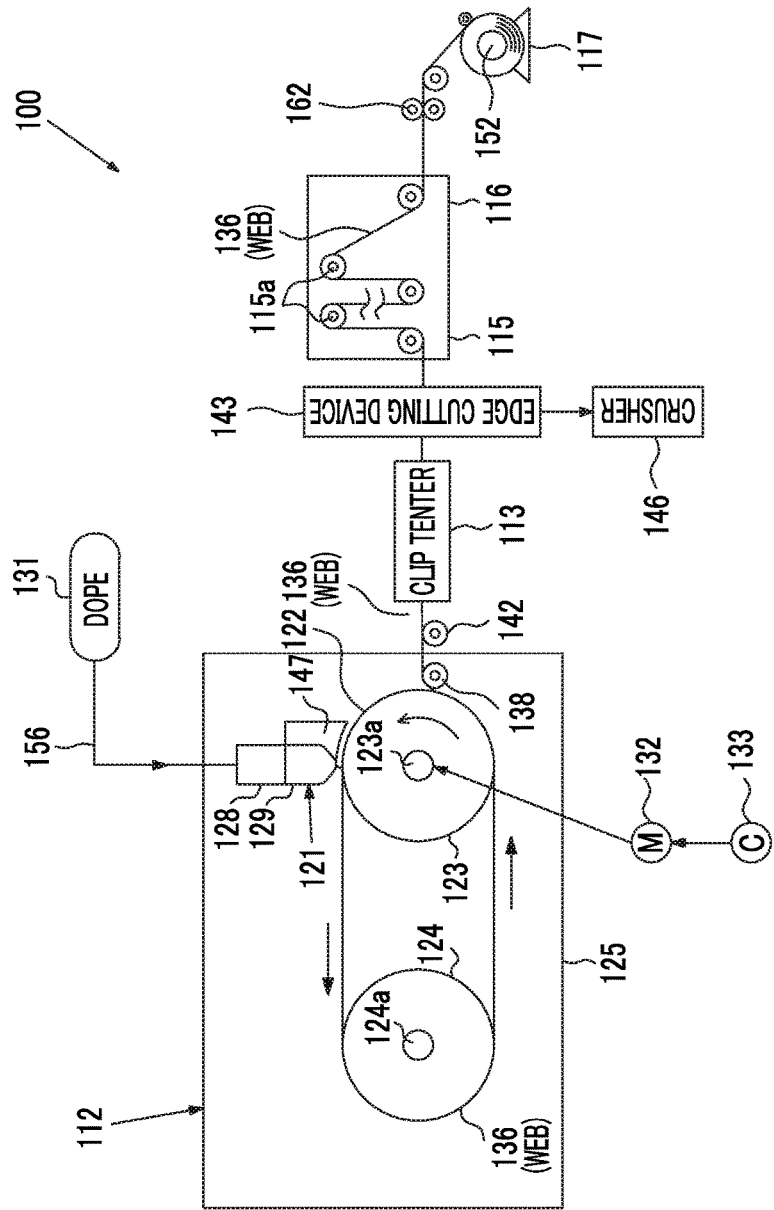
FIG. 5 is an explanatory diagram of an example of a solution casting film formation device (a casting support: a band).

In FIG. 5, an example of a device using a band as the casting support is illustrated. Solution film formation equipment 100 illustrated in FIG. 5 includes a casting device 112, a clip tenter 113, a drying chamber 115, a cooling chamber 116, and a winding device 117.

The casting device 112 includes a die unit 121, a band 122, a first roller 123 and a second roller 124, and a casting chamber 125. The die unit 121 is configured of a feed-block 128 and a casting die 129. The configuration of a casting die in a case of using two types of compositions (dopes) is as described above. A dope 131 which has been supplied to the feed-block 128 continuously flows out from the casting die 129.

The band 122 is an endless casting support which is formed into the shape of a ring, and is wound around the peripheral surface of the first roller 123 and the second roller 124. The first roller 123 includes a rotational axis 123a in the center of a circular side surface, and the rotational axis 123a is rotated in a circumferential direction by a motor 132. Accordingly, the first roller 23 is rotated in the circumferential direction. The driving of the motor 132 is controlled by a controller 133, and thus, the rotational speed of the rotational axis 123a is controlled. The band 122 travels in the longitudinal direction by rotating the first roller 123. The second roller 124 includes a rotational axis 124a in the center of a circular side surface, and is rotated by using the rotational axis 124a as a rotational center according to the travel of the wound band 122. Furthermore, in this embodiment, the band 122 travels by rotating the first roller 123, but the band 122 may travel by rotating at least one of the first roller 123 or the second roller 124 in the circumferential direction.

The dope 131 continuously flows out from the casting die 129 onto the band 122 which is travelling, and thus, a web 136 is continuously formed on the band 122.

In this embodiment, as illustrated in FIG. 5, the casting die 129 is arranged such that a downstream end of a winding region of the band 122 wound around the first roller 123 faces an outflow port of the casting die 129. However, the position of the casting die 129 is not limited thereto. For example, the casting die 129 may be arranged such that the outflow port faces the band 122 from the first roller 123 towards the second roller 124.

A reduced pressure chamber 147 suctioning air is arranged on the upstream of the die unit 121 in a rotational direction of the first roller 123. The reduced pressure chamber 147 suctions the air, and thus, the dope which flows from the casting die 129 to the band 122, that is, the pressure of the area on the upstream side in the rotational direction of the first roller 123 from the bead is reduced. Accordingly, the shape of the bead becomes stable.

The first roller 123 and the second roller 124 include a temperature adjustment machine (not illustrated) controlling a peripheral surface temperature. By controlling the peripheral surface temperature of the first roller 123 and the second roller 124, the temperature of the band 122 is controlled. By controlling the temperature of the band 122, the temperature of the web 136 is controlled, and the drying speed of the web 136 is adjusted.

A peeling roller 138 is arranged in the vicinity of the first roller 123. The peeling roller 138 is arranged such that the longitudinal direction is approximately parallel to the rotational axis 123a of the first roller 123. The peeling roller 138 supports the peeled web 136, and thus, a peeling position in which the web 136 is peeled off from the band 122 is constantly retained.

The casting chamber 125 contains the die unit 121, the first roller 123, the second roller 124, the band 122, and the peeling roller 138, and thus, it is possible to prevent a solvent evaporated from the web 136 from being diffused to the clip tenter on the downstream side, or the like. A roller 142 which supports the web 136 from the lower side and guides the web 136 to the clip tenter 113 is disposed in the passage from the casting chamber 125 to the clip tenter 113 on the downstream of the casting chamber 125.

The clip tenter 113 includes a plurality of clips (not illustrated) gripping each side portion of the web 136 in the width direction, and the clips travel on a track (not illustrated). The web 136 is transported by the travel of the clip. An air blowing machine (not illustrated) is arranged on at least one of an upper portion or a lower portion of a transport path of the web 136. The web 136 is dried by the outflow of dry air from the air blowing machine while being transported.

The web 136 may widen or narrow in the width direction according to the displacement of the track in the width direction of the web 136. For example, the web 136 widens in the width direction, and thus, it is possible to increase the widening rate thereof. In addition, for example, the width is constantly retained, and the like, and thus, it is possible to suppress the widening rate to be 0 (zero) or to be small. In addition, by controlling the temperature of the dry air from the air blowing machine, it is possible to control the temperature of the web 136. Furthermore, in the clip tenter 113, in a case where the width is constantly retained or widens, it is preferable that stress relaxation of the web 136 is performed by narrowing the width thereafter, and it is preferable that the web 136 is fed from the clip tenter 113 to the next step after the stress relaxation.

In general, a retaining trace due to the clipping of the clip tenter 113 is formed in both side end portions of the web 136 left the clip tenter 113. Therefore, it is preferable that the edge cutting device 143 is disposed on the downstream of the clip tenter 113. The edge cutting device 143 separates the both side portions having the retaining trace due to the clipping from the web 136 which has been guided. Accordingly, it is possible to stabilize the transportation in the drying chamber 115 and the downstream thereof. The both side portions separated from the web 136 are fed to the crusher 146 by air and are crushed, and thus, are reused as a raw material of the dope 131 or the like or are discard.

A plurality of rollers 115a are disposed in the drying chamber 115, and the web 136 is wound around the roller and is transported. The temperature, the humidity, or the like in the atmosphere in the drying chamber 115 is adjusted by an air conditioner (not illustrated), and the web 136 is dried while passing through the drying device 115. The heating in the drying chamber is as described in the embodiment illustrated in FIG. 2. In addition, in a case where the polymerization treatment is performed by the light irradiation, the polymerization treatment which is performed between the drying chamber 115 and the winding device 117 described below is also as described in the embodiment illustrated in FIG. 2.

The cooling chamber 116 of which the internal temperature is lower than that of the drying chamber 15 is able to be arranged on the downstream of the drying chamber 15. Accordingly, the web 136 is cooled while passing through the cooling chamber 116, and for example, the temperature of the web 136 becomes approximately room temperature.

A knurling imparting roller pair 162 is disposed on the downstream side of the cooling chamber 116, and thus, knurling is imparted to the both side portions of the web 136.

A winding core 152 is set in the winding device 117, and the winding device 117 rotates the winding core 152, and thus, the web 136 which has been guided is wound into the shape of a roll.

As described above, the method for producing a hard coat film according to one embodiment of the present invention has been described with reference to the specific embodiments. However, the hard coat film described above is not limited to a hard coat film produced by such a production method. A hard coat film which is produced by any production method is also included in the hard coat film according to one embodiment of the present invention insofar as the hard coat film includes the first layer and the second layer described above.

(Layer Capable of Being Laminated on Hard Coat Film)

A laminated film is able to be formed by laminating one or more other layers on one surface or both surfaces of the hard coat film described above. In a case where one or more other layers are disposed on the surface of the first layer, the thickness of the other layer (in a case of two or more layers, the total thickness) is preferably less than or equal to 5 μm, is more preferably less than or equal to 3 μm, is even more preferably less than or equal to 1 μm, and is still more preferably less than or equal to 0.5 μm, from the viewpoint of the abrasion resistance or the adhesiveness. The lower limit thereof, for example, is greater than or equal to 0.05 μm. Furthermore, the thickness of the other layer described above is able to be obtained by a known film thickness measurement method. The other layer is not particularly limited, and examples of the other layer are able to include known layers such as an antiglare layer, a layer of high refractive index, and a layer of low refractive index. The antiglare layer, for example, can be referred to paragraphs 0181 to 0182 of JP2013-101331A, and the layer of high refractive index and the layer of low refractive index, for example, can be referred to paragraphs 0183 to 0186 of JP2013-101331A.

[Polarizing Plate]

Another embodiment of the present invention relates to a polarizing plate including the hard coat film described above, and a polarizer. The hard coat film according to one embodiment of the present invention is able to function as a polarizing plate protective film. In particular, it is preferable that the hard coat film described above is arranged as the polarizing plate protective film such that the first layer or the another first layer becomes the outermost layer of the polarizing plate from the viewpoint of obtaining a polarizing plate having excellent abrasion resistance.

In general, in the polarizing plate, the polarizer is arranged between two protective films. The hard coat film according to one embodiment of the present invention is able to be at least one or both of the two protective films. In addition, in general, two polarizing plates (a visible side polarizing plate and a backlight side polarizing plate) interposing a liquid crystal cell therebetween are arranged in a liquid crystal display device. The polarizing plate according to one embodiment of the present invention may be used in both of the two polarizing plates, and in one embodiment, the polarizing plate is used as the visible side polarizing plate. One of the two protective films included in the visible side polarizing plate is arranged on the visible side, and the other is arranged on the liquid crystal cell side. In this case, the hard coat film according to one embodiment of the present invention may be used in both of the visible side protective film and the liquid crystal cell side protective film, and in one embodiment, the hard coat film is used as the visible side protective film. One of the two protective films included in the backlight side polarizing plate is arranged on the backlight side, and the other is arranged on the liquid crystal cell side. In this case, the hard coat film according to one embodiment of the present invention may be used in both of the backlight side protective film and the liquid crystal cell side protective film, and in one embodiment, the hard coat film is used as the backlight side protective film.

A polarizer which is obtained by dipping a polyvinyl alcohol film in an iodine solution, and by stretching the polyvinyl alcohol film, or the like is able to be used as the polarizer included in the polarizing plate described above. The details of the polarizer, for example, can be referred to paragraph 0117 of JP2011-136503A.

In one embodiment, one of the two protective films included in the polarizing plate is able to be the hard coat film described above, and the other is able to be an optical compensation film. A known film is able to be used as the optical compensation film.

[Image Display Device]

Another embodiment of the present invention relates to an image display device including the hard coat film described above.

Examples of the image display device are able to include various image display devices a liquid crystal display device (LCD), a plasma display panel (PDP), an electroluminescent display (ELD), and a cathode tube display device (CRT).

In one embodiment, the hard coat film described above is able to be a protective film which is arranged on the outside of a display surface of the image display device. It is preferable that the first layer or the another first layer is arranged to be the outermost layer from the viewpoint of improving the abrasion resistance of the image display device.

In addition, in one embodiment, the image display device is able to be a liquid crystal display device which includes a polarizing plate as an essential configuration member. In this case, it is preferable that the hard coat film described above is included as a protective film of the polarizing plate. The details of such a polarizing plate are as described above.

The liquid crystal cell of the liquid crystal display device is able to be a liquid crystal cell in various driving modes such as a TN mode, a VA mode, an OCB mode, an IPS mode, and an ECB mode.

According to one embodiment of the present invention, it is possible to provide a hard coat film which has an excellent result in both of a pencil hardness test and a SW resistance test, and has excellent abrasion resistance and excellent adhesiveness between the first layer and the second layer. By incorporating such a hard coat film as a protective film, it is possible to provide an image display device which is able to maintain excellent abrasion resistance for a long period of time.

EXAMPLES

Hereinafter, the present invention will be described in more detail on the basis of examples. Materials, use amounts, ratios, treatment contents, treatment sequences, and the like of the following examples are able to be suitably changed unless the changes cause deviance from the gist of the present invention. Therefore, the range of the present invention will not be restrictively interpreted by the following specific examples.

The temperature of a web in a casting film formation step described below was continuously monitored by a noncontact thermometer.

In addition, in the evaluation of hard coat films prepared in examples and comparative examples described below, a measurement sample was obtained by cutting a hard coat film of 20 cm square in all directions from a position which was separated from each of the outside surfaces in all directions of the hard coat film by greater than or equal to 1 cm.

Nine lattice points of lines dividing a vertical side and a horizontal side of the measurement sample described above into four portions at an interval of 5 cm were set as measurement portions, and the total thickness of the hard coat film was obtained as an arithmetic average value of values measured by a stylus type film thickness meter in each of the measurement portions.

The examples and the comparative examples described below were performed by using a film formation device for a test in which the configuration of the solution casting film formation device illustrated in FIG. 2 was simplified. In the examples and the comparative examples in which co-casting was performed, a casting die having a configuration illustrated in FIG. 3 was used as a casting die. The film formation device for a test includes a casting drum, and a film peeled off from the casting drum is transported to a drying chamber (a heating chamber) and is heated. Chambers other than the drying chamber were in the open system. The heating time was controlled by changing the transport distance of the drying chamber.

Example 1

Preparation of Composition for Casting Film Formation (Polymerizable Compound-Containing Cellulose Acylate Dope)

Composition described below were put into a mixing tank and were stirred, and each component was dissolved, and thus, a dope A was prepared.

(Solid Content)
Cellulose Acetate (Acetyl Substitution Degree 2.86, and Degree of Polymerization of 350) 100 parts by mass
Polyfunctional Polymerizable Compound 100 parts by mass (Decafunctional Urethane Acrylate (UV-1700B, manufactured by The Nippon Synthetic Chemical Industry Co., Ltd.), and Weight-Average Molecular Weight of 2,000)
Concentration of Solid Contents (with respect to 100 mass % of Total Amount of Composition) 24 mass % (Solvent Compositional Ratio: with respect to 100 mass % of Total Amount of Solvent, and in Parentheses Including Content with respect to 100 parts by mass of Cellulose Acetate)

| Methylene Chloride | 79 mass% (500 parts by mass) |
| Methanol | 20 mass% (127 parts by mass) |
| 1-Butanol | 1 mass% (6 parts by mass) |

<Preparation of Composition for Co-Casting (Cellulose Acylate Dope)>

Compositions described below were put into a mixing tank and were stirred, and each component was dissolved, and thus, a dope B was prepared.

(Solid Content)

Cellulose Acetate (Acetyl Substitution Degree of 2.86, and Degree of Polymerization of 350)

Concentration of Solid Contents (with respect to 100 mass % of Total Amount of Composition) 24 mass % (Solvent Compositional Ratio: with respect to 100 mass % of Total Amount of Solvent, and in Parentheses Including Content with respect to 100 parts by mass of Cellulose Acetate)

| | |
|---|---|
| Methylene Chloride | 79 mass% (625 parts by mass) |
| Methanol | 20 mass% (158 parts by mass) |
| 1-Butanol | 1 mass% (8 parts by mass) |

<Casting Film Formation of Cellulose Acylate Film>

In the dopes A and B described above, the dope A was used as a dope a illustrated in FIG. 3 and the dope B was used as a dope b illustrated in FIG. 3, the flow rate of the dope was adjusted such that the dope A and the dope B were applied in this order from an air surface side towards a support surface side and each of the film thicknesses (set film thicknesses) corresponded to 30 µm, and the dope was co-cast onto the drum support of which the surface temperature was 5° C. from the casting die, and thus, a web was formed. After that, dehumidified air at 40° C. was brought into contact on the drum support, and the web was peeled off from the drum support.

Dry air was blown to the travelling web in a drying chamber, the web was heated at a heating temperature of 140° C. for 20 minutes, a solvent was dried, and the polyfunctional polymerizable compound described above in the web was leached from the surface on the air surface side. The polyfunctional polymerizable compound described above being leached was confirmed by visually observing the stickiness (a wet state) on the surface of the web after being dried. Further, the web was heated at a heating temperature of 190° C. for 20 minutes in the drying chamber while travelling. In the polyfunctional polymerizable compound described above, a polymerizable group generated radicals at a temperature of higher than or equal to approximately 170° C., and thus, a polymerization reaction was initiated. The heating temperature was controlled by setting the temperature of the dry air. The total thickness of a hard coat film formed as described above was 60 µm.

Furthermore, separately from the film formation of the hard coat film, in order to analyze a component which was leached onto the surface of the web, the component leached onto the surface of the web which was heated at a heating temperature of 140° C. for 20 minutes as described above was wiped with acetone, and was subjected to NMR and FT-IR analysis (Fourier transform infrared spectroscopic analysis), and thus, it was confirmed that the leached component was the polyfunctional polymerizable compound.

<Detection of Polymer and Cellulose Acylate in Each Region, and Thickness Measurement in Each Region>

In the hard coat films prepared in the examples and the comparative examples, a region 1, a region 2, and a region 3 were specified and the thicknesses in the respective regions were determined by the composition analysis using the RAMAN spectroscopy described below from the surface on the air surface side at the time of performing casting towards a thickness direction. The region 1 is a region in which a polymer of the polyfunctional polymerizable compound is detected as a main component, and the cellulose acetate is not detected. The region 2 is a region adjacent to the region 1 in which both of the polymer and the cellulose acetate described above are both detected. The region 3 is a region adjacent to the region 2 on the interface opposite to the region 1.

(1) Composition Analysis Using RAMAN Spectroscopy

The composition analysis was performed by using a confocal RAMAN microscope (NanoFinder30, manufactured by Tokyo Instruments, Inc.). The excitation wavelength was 785 nm, the laser power was 18 mW, and an objective lens having a magnification of 100 was used. The integrating accumulation time was 120 seconds.

In a measurement sample of 20 cm square cut out from the hard coat film as described above, each measurement position was determined at an interval of 5 cm in the thickness direction in three sectional surfaces obtained by cutting the measurement sample at an interval of 5 cm. Thus, nine measurement positions were determined. In each of the measurement positions, measurement portions (121 portions in Example 1) at an interval of 0.5 µm in a film thickness direction from the surface on the air surface side at the time of performing casting were subjected to the composition analysis of the RAMAN spectroscopy (a microscopic RAMAN spectroscopy) using the RAMAN microscope described above, and content of the polymer of the polyfunctional polymerizable compound described above and the content of the cellulose acetate described above were measured in each of the measurement portions. In the hard coat film prepared in Example 1, the content of the polymer described above was 100 mass %, and the cellulose acetate was not detected, in the measurement portion of less than or equal to 4.5 µm from the surface on the air surface side at the time of performing casting. In contrast, in the measurement portion of 5.0 µm from the surface on the air surface side, the content of the polymer described above was 19 mass %, and the content of the polymer described above was gradually reduced from the surface on the air surface side at the time of performing casting towards the surface on the support side, and in the measurement portion on the surface on the support surface side, the content of the polymer described above was 10 mass %, and the cellulose acetate was detected other than the polymer described above.

As described above, in the hard coat film prepared in Example 1, it was determined that the region 1 (a first layer) had a film thickness of 5.0 µm, and the region 2 (a second layer) had a film thickness of 55.0 µm.

Similarly, the examples and the comparative examples described below were subjected to the composition analysis and the sectional surface observation.

Example 2

A hard coat film having a total thickness shown in Table 1 was obtained by the same method as that in Example 1 except that the amount of polyfunctional polymerizable compound with respect to 100 parts by mass of the cellulose acylate in the dope A was changed to have a value shown in Table 1, and each of the set film thicknesses of the dope A and the dope B was changed to have a value shown in Table 1.

As a result of measuring the surface smoothness of the obtained hard coat film by the following method, an arithmetic average roughness Ra was 303 nm.

Example 3

A hard coat film having a total thickness shown in Table 1 was obtained by the same method as that in Example 1 except that the amount of polyfunctional polymerizable compound with respect to 100 parts by mass of the cellulose acylate in the dope A was changed to have a value shown in Table 1, and each of the set film thicknesses of the dope A and the dope B was changed to have a value shown in Table 1.

Comparative Example 1

A hard coat film having a total thickness shown in Table 1 was obtained by the same method as that in Example 1 except that the amount of polyfunctional polymerizable compound with respect to 100 parts by mass of the cellulose acylate in the dope A was changed to have a value shown in Table 1, and each of the set film thicknesses of the dope A and the dope B was changed to have a value shown in Table 1.

Example 4

A hard coat film having a total thickness shown in Table 1 was obtained by the same method as that in Example 2 except that the set film thickness of the dope B was changed to have a value shown in Table 1.

Example 5

A hard coat film having a total thickness shown in Table 1 was obtained by the same method as that in Example 3 except that the set film thickness of the dope B was changed to have a value shown in Table 1.

Comparative Example 2

A hard coat film having a total thickness shown in Table 1 was obtained by the same method as that in Comparative Example 1 except that the set film thickness of the dope B was changed to have a value shown in Table 1.

Example 6

A hard coat film having a total thickness shown in Table 1 was obtained by the same method as that in Example 2 except that the set film thickness of the dope B was changed to have a value shown in Table 1.

Example 7

A hard coat film having a total thickness shown in Table 1 was obtained by the same method as that in Example 3 except that the set film thickness of the dope B was changed to have a value shown in Table 1.

Comparative Example 3

A hard coat film having a total thickness shown in Table 1 was obtained by the same method as that in Comparative Example 1 except that the set film thickness of the dope B was changed to have a value shown in Table 1.

Example 8

A hard coat film having a total thickness shown in Table 1 was obtained by the same method as that in Example 3 except that the set film thickness of the dope B was changed to have a value shown in Table 1.

Comparative Example 4

A hard coat film having a total thickness shown in Table 1 was obtained by the same method as that in Comparative Example 1 except that the set film thickness of the dope B was changed to have a value shown in Table 1.

Example 9

A hard coat film having a total thickness shown in Table 1 was obtained by the same method as that in Example 1 except that each of the set film thicknesses of the dope A and the dope B was changed to have a value shown in Table 1.

Comparative Example 5

A hard coat film having a total thickness shown in Table 1 was obtained by the same method as that in Example 9 except that the amount of polyfunctional polymerizable compound with respect to 100 parts by mass of the cellulose acylate in the dope A was changed to 50 parts by mass.

Comparative Example 6

A hard coat film having a total thickness shown in Table 1 was obtained by the same method as that in Comparative Example 5 except that the dope B was not used, and the dope A used in Comparative Example 5 was cast to have a set film thickness shown in Table 1.

Comparative Example 7

A hard coat film having a total thickness shown in Table 1 was obtained by the same method as that in Comparative Example 6 except that the polyfunctional polymerizable compound used in the dope A was changed to methacrylate 2-methoxy ethyl (manufactured by Mitsubishi Rayon Co., Ltd.) (monofunctional acrylate, and a molecular weight of 144) which is a monofunctional polymerizable compound.

Example 10

A hard coat film having a total thickness shown in Table 1 was obtained by the same method as that in Example 2 except that the polyfunctional polymerizable compound used in the dope A was changed to U-6LPA (manufactured by Shin Nakamura Chemical Co., Ltd., hexafunctional urethane acrylate, and a weight-average molecular weight of 800).

Example 11

A hard coat film having a total thickness shown in Table 1 was obtained by the same method as that in Example 2 except that the polyfunctional polymerizable compound used in the dope A was changed to KAYARAD DPHA (manufactured by Nippon Kayaku Co., Ltd., hexafunctional acrylate, and a molecular weight of 579).

Example 12

A hard coat film having a total thickness shown in Table 1 was obtained by the same method as that in Example 2 except that the polyfunctional polymerizable compound used in the dope A was changed to ARONIX M-309 (manufactured by TOAGOSEI CO., LTD., trifunctional acrylate, and a molecular weight of 296).

Comparative Example 8

A hard coat film having a total thickness shown in Table 1 was obtained by the same method as that in Example 2 except that the polyfunctional polymerizable compound used in the dope A was changed to LIGHT ACRYLATE NP-A (manufactured by Kyoeisha Chemical Co., Ltd., difunctional acrylate, and a molecular weight of 212).

Comparative Example 9

A hard coat film having a total thickness shown in Table 1 was obtained by the same method as that in Example 2 except that the polyfunctional polymerizable compound used in the dope A was changed to methacrylate 2-methoxy ethyl (manufactured by Mitsubishi Rayon Co., Ltd.) (monofunctional acrylate, and a molecular weight of 144) which is a monofunctional polymerizable compound.

Example 13

A hard coat film having a total thickness shown in Table 1 was obtained by the same method as that in Example 2 except that the heat treatment in the drying chamber was performed by an one-step heat treatment in which dry air was blown to the travelling web in the drying chamber, and the web was heated at a heating temperature of 190° C. for 20 minutes.

Example 14

Compositions described below were put into a mixing tank and were stirred, and each component was dissolved, and thus, a dope A was prepared. A hard coat film having a total thickness shown in Table 1 was obtained by the same method as that in Example 13 except that the dope A prepared as described above was used and the one-step heat treatment was performed at a heating temperature of 180° C. for 20 minutes. A thermal polymerization initiator described below is activated at approximately 180° C. and generates radicals, and thus, a polymerization reaction is initiated.

Cellulose Acetate (Acetyl Substitution Degree of 2.86, and Degree of Polymerization of 350) 100 parts by mass Polyfunctional Polymerizable Compound 150 parts by mass (Decafunctional Urethane Acrylate (UV-1700B, manufactured by The Nippon Synthetic Chemical Industry Co., Ltd.), and Weight-Average Molecular Weight of 2,000)

| Thermal Polymerization Initiator* | 7.5 parts by mass |
| Methylene Chloride | 625 parts by mass |
| Methanol | 158 parts by mass |
| 1-Butanol | 8 parts by mass |

*Hydroxyl Amine Ester Compound (Exemplary Compound (H-1) (Described above)

Example 15

A hard coat film having a total thickness shown in Table 1 was obtained by the same method as that in Example 14 except that the thermal polymerization initiator used in the dope A was changed to VAm-110 manufactured by Wako Pure Chemical Industries, Ltd.: 2,2'-azobis(N-butyl-2-methyl propionamide) and the heating temperature was changed to 140° C.

Example 16

Compositions described below were put into a mixing tank and were stirred, and each component was dissolved, and thus, a dope A was prepared. A hard coat film having a total thickness shown in Table 1 was obtained by the same method as that in Example 13 except that the dope A prepared as described above was used and a polymerization treatment (photopolymerization) was performed by blowing dry air to the travelling web in the drying chamber, by heating the web at a heating temperature of 140° C. for 20 minutes, and then, by irradiating the web with ultraviolet ray at an exposure amount of 150 mJ/cm² using an ultraviolet irradiation device of a metal halide lamp in the outside of the drying chamber.

Cellulose Acetate (Acetyl Substitution Degree of 2.86, and Degree of Polymerization of 350) 100 parts by mass Polyfunctional Polymerizable Compound 150 parts by mass (Decafunctional Urethane Acrylate (UV-1700B manufactured by The Nippon Synthetic Chemical Industry Co., Ltd.), and Weight-Average Molecular Weight of 2,000)

Photopolymerization Initiator (IRGACURE(Irg)819 manufactured by BASF SE) 2.5 parts by mass Fluorine-Containing Photopolymerization Initiator Described below 5.0 parts by mass

| Methylene Chloride | 625 parts by mass |
| Methanol | 158 parts by mass |
| 1-Butanol | 8 parts by mass |

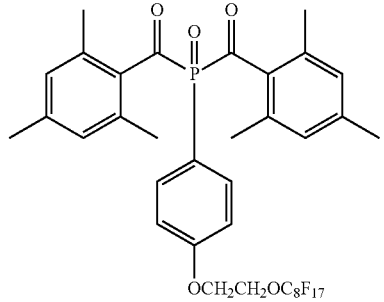

Comparative Example 10

A hard coat film having a total thickness shown in Table 1 was obtained by the same method as that in Example 16 except that a polymerization treatment was performed by irradiating the web with an ultraviolet ray at an exposure amount of 150 mJ/cm² using an ultraviolet irradiation device of a halogen lamp until the film peeled off from the casting drum was transported to the drying chamber (the heating chamber) and the ultraviolet irradiation was not performed after heating in the drying chamber.

Comparative Example 11

A hard coat film including the hard coat layer on the cellulose acylate film was prepared by the following method.

Only the dope B used in Example 1 was used, the flow rate of the dope was adjusted such that the film thickness (the set film thickness) corresponded to 60 μm, and the dope was co-cast onto the drum support of which the surface temperature was 5° C. from the casting die, and thus, a web was formed. After that, dehumidified air at 40° C. was brought into contact on the drum support, and the web was peeled off from the drum support.

A cellulose acylate film was obtained by the same method as that in Example 1 except that dry air was blown to the travelling web in a drying chamber and the web was dried by being heated at a heating temperature of 140° C. for 20 minutes.

Components described below were mixed, and then, were filtered through a polypropylene filter having a hole diameter of 30 μm, and thus, a coating liquid for a hard coat layer was prepared.

| Polymerizable Composition | 53.5 parts by mass |
|---|---|

Mixture of Pentaerythritol Triacrylate/Pentaerythritol Tetraacrylate of 3/2 (Mass Ratio)
Photopolymerization Initiator (IRGACURE(Irg)127 manufactured by BASF SE) 1.5 parts by mass

| Ethyl Acetate | 45.0 parts by mass |
|---|---|

The coating liquid for a hard coat layer described above was applied onto one surface of the prepared cellulose acylate film to have a coating thickness of 5 μm in conditions of a transport speed of 30 m/minute by a microgravure coating method. A coated layer was dried in an atmosphere of 60° C. for 150 seconds, and then, was cured by being irradiated with an ultraviolet ray having an irradiance of 400 mW/cm$^2$ and an irradiation dose of 150 mJ/cm$^2$ using an air-cooled metal halide lamp (manufactured by EYE GRAPHICS CO., LTD.) of 160 W/cm while performing nitrogen purge (an oxygen concentration of less than or equal to 0.5%), and thus, a hard coat layer was formed.

Thus, the hard coat layer was formed on the surface of the cellulose acylate film on the air side, and thus, a cellulose acylate film attached with a hard coat layer was prepared.

Example 17

A hard coat film having a total thickness shown in Table 1 was obtained by the same method as that in Example 2 except that an ultraviolet absorbent described below was added to the dope B such that the content of the ultraviolet absorbent was 2 parts by mass with respect to 100 parts by mass of the cellulose acetate.

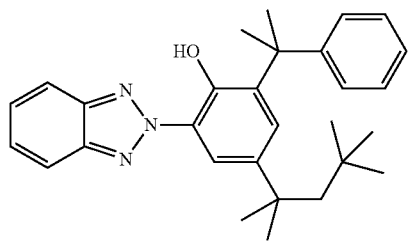

*Ultraviolet Absorbent
(Tinuvin928 manufactured by BASF SE)

Example 18

A hard coat film having a total thickness shown in Table 1 was obtained by the same method as that in Example 2 except that the ultraviolet absorbent described above was added to the dope A such that the content of the ultraviolet absorbent was 5 parts by mass with respect to 100 parts by mass of the cellulose acetate.

Example 19

A hard coat film having a total thickness shown in Table 1 was obtained by the same method as that in Example 16 except that the dope B prepared in Example 17 was used as the dope B.

Example 20

A hard coat film having a total thickness shown in Table 1 was obtained by the same method as that in Example 2 except that a surfactant (a fluorine-based compound, MEGAFACE F-784 manufactured by DIC Corporation) was added to the to the dope A such that the content of the surfactant was 0.1 parts by mass with respect to 100 parts by mass of the cellulose acetate.

As a result of measuring the surface smoothness of the obtained hard coat film by the following method, the arithmetic average roughness Ra was 2 nm.

Example 21

A hard coat film having a total thickness shown in Table 1 was obtained by the same method as that in Example 1 except that the dope B was not used and the dope A used in Example 1 was cast to have a set film thickness shown in Table 1.

Example 22

A hard coat film having a total thickness shown in Table 1 was obtained by the same method as that in Example 1 except that each of the set film thicknesses of the dope A and the dope B was changed to have a value shown in Table 1.

Comparative Example 12

Preparation of Composition for Casting Film Formation (Polymerizable Compound-Containing Cellulose Acylate Dope)

Compositions described below were put into a mixing tank and were stirred, and each component was dissolved, and thus, a dope A was prepared.

(Solid Content)

Cellulose Acetate (Acetyl Substitution Degree of 2.86, and Degree of Polymerization of 350) 100 parts by mass

| Polyfunctional Polymerizable Compound | 500 parts by mass |
|---|---|

(Hexafunctional Acrylate (KAYARAD DPHA manufactured by Nippon Kayaku Co., Ltd.), and a Weight-Average Molecular Weight of 579)

Concentration of Solid Contents (with respect to 100 mass % of Total Amount of Composition) 24 mass % (Solvent Compositional Ratio: with respect to 100 mass % of Total Amount of Solvent, and in Parentheses Including Content with respect to 100 parts by mass of Cellulose Acetate)

| Methylene Chloride | 79 mass% (1501 parts by mass) |
| Methanol | 20 mass% (380 parts by mass) |
| 1-Butanol | 1 mass% (19 parts by mass) |

Example 23

A hard coat film having a total thickness shown in Table 1 was obtained by the same method as that in Example 1 except that cellulose acetate (Acetyl Substitution Degree of 2.71, and Degree of Polymerization of 350) was used as the cellulose acetate used in the dope B.

Example 24

A hard coat film having a total thickness shown in Table 1 was obtained by the same method as that in Example 1 except that cellulose acetate (Acetyl Substitution Degree of 2.43, and Degree of Polymerization of 350) was used as the cellulose acetate used in the dope B.

<Casting Film Formation of Cellulose Acylate Film>

A hard coat film having a total thickness Table 1 was obtained by the same method as that in Example 16 except that the dope A described above was used, each of the set film thicknesses of the dope A and the dope B was changed to have a value shown in Table 1, a polymerization treatment was performed by irradiating the web before being peeled off from the casting drum with an ultraviolet ray at an exposure amount 50 mJ/cm$^2$ using an ultraviolet irradiation device of a halogen lamp, and a polymerization treatment was performed by irradiating the web after being heated in the drying chamber with an ultraviolet ray at an exposure amount of 100 mJ/cm$^2$ using the ultraviolet irradiation device described above.

<Detection of Polymer and Cellulose Acylate in Each Region, and Thickness Measurement in Each Region>

The hard coat film obtained in Comparative Example 12 was subjected to composition analysis by the method described above. As a result thereof, the polymer (a content of 82 mass %) was detected in a measurement portion on the surface on the air surface side at the time of performing casting, and the cellulose acylate was detected as a residue. That is, the region 1 did not exist, and the surface on the air surface side at the time of performing casting was determined as the region 2. As a result of the composition analysis, the content of the polymer was gradually reduced from the surface on the air surface side at the time of performing casting towards the surface on the support side at the time of performing casting, and in a measurement portion of 10.0 μm from the surface on the air surface side at the time of performing casting, the content of the polymer was 2 mass % (Residue: Cellulose Acetate), and in a measurement portion of greater than or equal to 10.5 μm from the surface on the air surface side at the time of performing casting, the polymer was not detected, and the cellulose acetate was detected as a component having a content of 100 mass %. That is, a region of greater than or equal to 10 μm from the surface on the air surface side at the time of performing casting was determined as the region 3.

As described above, it was determined that the thickness of the region 2 was 10.0 μm and the thickness of the region 3 was 50.0 μm.

Evaluation Method (1) Pencil Hardness Test

The hard coat film was subjected to humidity adjustment in conditions of a temperature of 25° C. and relative humidity of 60% for 2 hours, and then, the surface of the hard coat film was repeatedly scratched with a pencil having each hardness 10 times by using a test pencil defined in JIS-S6006 and a weight of 500 g according to a pencil hardness evaluation method defined in JIS-K5400, and thus, the hardness in which the number of scratches was less than or equal to 5 was measured. Furthermore, a scratch defined in JIS-K5400 indicates a crack in the coated film and a scratch in the coated film, and it was disclosed that a dent in the coated film is not a target in JIS-K5400, but in this evaluation, the dent in the coated film is also determined as the scratch.

(2) SW Resistance Test

A rubbing test was performed by using a rubbing tester in the following conditions.

Evaluation Environment Conditions: 25° C., 60% RH

Rubbing Material: Steel wool (No. 0000 manufactured by NIHON STEEL WOOL Co., Ltd.) was wound around a rubbing distal end portion (1 cm×1 cm) of a tester which was in contact with a sample, and was fixed with a band not to be moved.

Movement Distance (One-Way): 13 cm, Rubbing Speed: 13 cm/second, Load: 500 g, Distal End Portion Contact Area: 1 cm×1 cm, and Number of Times of Rubbing: 10 reciprocations.

Oily black ink was applied onto the back side of the sample (an optically anisotropic layer side) in which the rubbing has finished, and visual observation was performed by reflected light, and thus, a scratch in a rubbing portion was evaluated on the basis of the following criteria.

A: A change is not visible.

B: A scratch is not observed, but a change in the shade is slightly observed.

C: A slight scratch which is hardly visible occurs.

D: A scratch which is visible occurs.

(3) Adhesiveness Test

The measurement sample which had been subjected to the composition analysis described above and sectional surface observation using an optical microscope was subjected to a crosscut test on the basis of JIS D0202-1988. In 100 sample pieces formed by being cut into the shape of a lattice, the adhesiveness was evaluated on the basis of the number of peeled sample pieces due to bonding and peeling of tape and the following criteria. A measurement sample in which peeling occurred was subjected to the sectional surface observation using the optical microscope as described above, and thus, it was confirmed that peeling occurred on the interface between the first layer and the second layer.

A: Zero

B: 1 to 5 sample pieces

C: 6 to 10 sample pieces

D: 11 to 100 sample pieces (4) Evaluation of Surface Smoothness

A measurement sample was obtained from the hard coat films prepared in Example 2 and Example 20 by the method described above. Nine portions in total, on the surface on the air interface side at the time of casting the measurement sample at an interval of 5 cm in all directions were set to measurement portions, and arithmetic average roughness (Ra) measurement based on JIS B0601-2013 was performed. VertScan2.0 manufactured by Ryoka Systems Inc. was used in a measurement device, the surface shape of a region of 600 μm square was measured, and thus, Ra was obtained. The arithmetic average of Ra's in the respective measurement portion was set to Ra of the measurement sample.

The results described above are shown in Table 1 described below along with the results of the composition analysis of the hard coat film using the method described above and the results of the thickness measurement in each of the regions. Furthermore, in the examples, the region 1 shown in Table 1 described below corresponds to the first layer, the region 2 shown in Table 1 described below corresponds to the second layer, and the region 3 shown in Table 1 described below corresponds to the third layer or the another first layer.

TABLE 1

| | Dope A | | | | | | Dope B | | |
|---|---|---|---|---|---|---|---|---|---|
| | Polymerizable Compound | | | Additive | | Set Film Thickness at Time of Casting | Additive | | Set Film Thickness at Time of Casting |
| | Type | Molecular Weight[1] | Added Amount[2] | Type | Added Amount[2] | | Type | Added Amount[2] | |
| Example 1 | Poly-functional | 2,000 | 100 Parts by Mass | — | — | 30 μm | — | — | 30 μm |
| Example 2 | Poly-functional | 2,000 | 150 Parts by Mass | — | — | 20 μm | — | — | 40 μm |
| Example 3 | Poly-functional | 2,000 | 300 Parts by Mass | — | — | 10 μm | — | — | 50 μm |
| Comparative Example 1 | Poly-functional | 2,000 | 500 Parts by Mass | — | — | 5 μm | — | — | 55 μm |
| Example 4 | Poly-functional | 2,000 | 150 Parts by Mass | — | — | 20 μm | — | — | 60 μm |
| Example 5 | Poly-functional | 2,000 | 300 Parts by Mass | — | — | 10 μm | — | — | 70 μm |
| Comparative Example 2 | Poly-functional | 2,000 | 500 Parts by Mass | — | — | 5 μm | — | — | 75 μm |
| Example 6 | Poly-functional | 2,000 | 150 Parts by Mass | — | — | 20 μm | — | — | 20 μm |
| Example 7 | Poly-functional | 2,000 | 300 Parts by Mass | — | — | 10 μm | — | — | 30 μm |
| Comparative Example 3 | Poly-functional | 2,000 | 500 Parts by Mass | — | — | 5 μm | — | — | 35 μm |
| Example 8 | Poly-functional | 2,000 | 300 Parts by Mass | — | — | 10 μm | — | — | 15 μm |
| Comparative Example 4 | Poly-functional | 2,000 | 500 Parts by Mass | — | — | 5 μm | — | — | 20 μm |
| Example 9 | Poly-functional | 2,000 | 100 Parts by Mass | — | — | 20 μm | — | — | 40 μm |
| Comparative Example 5 | Poly-functional | 2,000 | 50 Parts by Mass | — | — | 20 μm | — | — | 40 μm |
| Comparative Example 6 | Poly-functional | 2,000 | 50 Parts by Mass | — | — | 60 μm | — | — | 0 μm |
| Comparative Example 7 | Poly-functional | 144 | 50 Parts by Mass | — | — | 60 μm | — | — | 0 μm |
| Example 10 | Poly-functional | 800 | 150 Parts by Mass | — | — | 20 μm | — | — | 40 μm |
| Example 11 | Poly-functional | 579 | 150 Parts by Mass | — | — | 20 μm | — | — | 40 μm |
| Example 12 | Poly-functional | 296 | 150 Parts by Mass | — | — | 20 μm | — | — | 40 μm |
| Comparative Example 8 | Poly-functional | 212 | 150 Parts by Mass | — | — | 20 μm | — | — | 40 μm |
| Comparative Example 9 | Poly-functional | 144 | 150 Parts by Mass | — | — | 20 μm | — | — | 40 μm |
| Example 13 | Poly-functional | 2,000 | 150 Parts by Mass | — | — | 20 μm | — | — | 40 μm |
| Example 14 | Poly-functional | 2,000 | 150 Parts by Mass | Thermal Polymerization Initiator | 7.5 Parts by Mass | 20 μm | — | — | 40 μm |
| Example 15 | Poly-functional | 2,000 | 150 Parts by Mass | Thermal Polymerization Initiator | 7.5 Parts by Mass | 20 μm | — | — | 40 μm |
| Example 16 | Poly-functional | 2,000 | 150 Parts by Mass | Photo-polymerization Initiator | 7.5 Parts by Mass | 20 μm | — | — | 40 μm |
| Comparative Example 10 | Poly-functional | 2,000 | 150 Parts by Mass | Photo-polymerization Initiator | 7.5 Parts by Mass | 20 μm | — | — | 40 μm |
| Comparative Example 11 | Poly-functional | — | — | — | — | — | — | — | 60 μm |
| Example 17 | Poly-functional | 2,000 | 150 Parts by Mass | — | — | 20 μm | Ultraviolet Absorbent | 2 Parts by Mass | 40 μm |
| Example 18 | Poly-functional | 2,000 | 150 Parts by Mass | Ultraviolet Absorbent | 5 Parts by Mass | 20 μm | — | — | 40 μm |
| Example 19 | Poly-functional | 2,000 | 150 Parts by Mass | Photo-polymerization Initiator | 7.5 Parts by Mass | 20 μm | Ultraviolet Absorbent | 2 Parts by Mass | 40 μm |

TABLE 1-continued

| | | | | | | | | |
|---|---|---|---|---|---|---|---|---|
| Example 20 | Poly-functional | 2,000 | 150 Parts by Mass | Surfactant | 0.1 Parts by Mass | 20 μm | — | — | 40 μm |
| Example 21 | Poly-functional | 2,000 | 100 Parts by Mass | — | — | 60 μm | — | — | 0 μm |
| Example 22 | Poly-functional | 2,000 | 100 Parts by Mass | — | — | 100 μm | — | — | 100 μm |
| Comparative Example 12 | Poly-functional | 579 | 500 Parts by Mass | — | — | 5 μm | — | — | 55 μm |
| Example 23 | Poly-functional | 2,000 | 100 Parts by Mass | — | — | 30 μm | — | — | 30 μm |
| Example 24 | Poly-functional | 2,000 | 100 Parts by Mass | — | — | 30 μm | — | — | 30 μm |

| | Total Thickness of Hard Coat Film | Production Process[3] | Region 1 | Region 2 | Region 3[4] | Pencil Hardness | SW Resistance | Evaluation Result Adhesiveness (Numerical Value Indicates Number of Peeled Sample Pieces) |
|---|---|---|---|---|---|---|---|---|
| Example 1 | 60.0 μm | A | 5.0 μm | 55.0 μm | None (0 μm) | 4H | A | A0 |
| Example 2 | 60.0 μm | A | 5.0 μm | 35.5 μm | 19.5 μm* | 4H | A | A0 |
| Example 3 | 60.0 μm | A | 4.5 μm | 18.5 μm | 37.0 μm* | 3H | A | B4 |
| Comparative Example 1 | 60.0 μm | A | 4.5 μm | 10.0 μm | 45.5 μm* | 2H | A | D19 |
| Example 4 | 80.0 μm | A | 4.5 μm | 35.5 μm | 40.0 μm* | 4H | A | A0 |
| Example 5 | 80.0 μm | A | 4.5 μm | 18.5 μm | 57.0 μm* | 4H | A | B5 |
| Comparative Example 2 | 80.0 μm | A | 4.0 μm | 11.0 μm | 65.0 μm* | 2H | A | D17 |
| Example 6 | 40.0 μm | A | 5.0 μm | 35.5 μm | None (0 μm) | 4H | A | A0 |
| Example 7 | 40.0 μm | A | 5.0 μm | 17.0 μm | 18.0 μm* | 4H | A | B5 |
| Comparative Example 3 | 40.0 μm | A | 4.5 μm | 10.5 μm | 25.0 μm* | 2H | A | D22 |
| Example 8 | 25.0 μm | A | 5.0 μm | 20.0 μm | None (0 μm) | 4H | A | B3 |
| Comparative Example 4 | 25.0 μm | A | 5.0 μm | 10.0 μm | 10.0 μm* | 2H | A | D23 |
| Example 9 | 60.0 μm | A | 3.0 μm | 30.0 μm | 27.0 μm* | 3H | A | A0 |
| Comparative Example 5 | 60.0 μm | A | None (0 μm) | 25.5 μm | 34.5 μm* | H | D | — |
| Comparative Example 6 | 60.0 μm | A | None (0 μm) | 60.0 μm | None (0 μm) | H | D | — |
| Comparative Example 7 | 60.0 μm | A | None (0 μm) | 60.0 μm | None (0 μm) | HB | D | — |
| Example 10 | 60.0 μm | A | 3.5 μm | 40.0 μm | 16.5 μm* | 3H | A | A0 |
| Example 11 | 60.0 μm | A | 2.0 μm | 50.0 μm | 8.0 μm* | 3H | B | A0 |
| Example 12 | 60.0 μm | A | 1.0 μm | 59.0 μm | None (0 μm) | 2H | B | A0 |
| Comparative Example 8 | 60.0 μm | A | None (0 μm) | 60.0 μm | None (0 μm) | H | D | — |
| Comparative Example 9 | 60.0 μm | A | None (0 μm) | 60.0 μm | None (0 μm) | HB | D | — |
| Example 13 | 60.0 μm | B-1 | 4.0 μm | 36.5 μm | 19.5 μm* | 4H | A | A0 |
| Example 14 | 60.0 μm | B-2 | 3.0 μm | 32.0 μm | 25.0 μm* | 3H | A | A0 |
| Example 15 | 60.0 μm | B-3 | 2.0 μm | 32.5 μm | 25.5 μm* | 2H | B | A0 |
| Example 16 | 60.0 μm | C-1 | 4.5 μm | 34.5 μm | 21.0 μm* | 4H | A | A0 |
| Comparative Example 10 | 60.0 μm | C-2 | None (0 μm) | 35.5 μm | 24.5 μm* | 3H | D | — |
| Comparative Example 11 | 65.0 μm | D | 5.0 μm | 1.0 μm | 59.0 μm* | 3H | A | D20 |
| Example 17 | 60.0 μm | A | 5.0 μm | 35.0 μm | 20.0 μm* | 4H | A | A0 |
| Example 18 | 60.0 μm | A | 5.0 μm | 35.0 μm | 20.0 μm* | 4H | A | A0 |
| Example 19 | 60.0 μm | C-1 | 4.5 μm | 35.0 μm | 20.5 μm* | 4H | A | A0 |
| Example 20 | 60.0 μm | A | 5.0 μm | 35.0 μm | 20.0 μm* | 4H | A | A0 |
| Example 21 | 60.0 μm | A | 6.0 μm | 48.5 μm | 5.5 μm** | 4H[5] 4H[6] | A[5] A[6] | A0[5] A0[6] |
| Example 22 | 200.0 μm | A | 6.5 μm | 137.0 μm | 56.5 μm* | 4H | A | A0 |
| Comparative | 60.0 μm | C-3 | None | 10.0 μm | 50.0 μm* | 2H | C | A0 |

TABLE 1-continued

| | | | | | | | | |
|---|---|---|---|---|---|---|---|---|
| Example 12 | | | (0 μm) | | | | | |
| Example 23 | 60.0μm | A | 7.0 μm | 54.0 μm | None (0 μm) | 5H | A | A0 |
| Example 24 | 60.0μm | A | 9.0 μm | 53.0 μm | None (0 μm) | 5H | A | A0 |

[1] Weight-Average Molecular Weight with respect to Multimer and Mixture
[2] with respect to 100 Parts by Mass of Cellulose Acetate
[3] Process A: Casting → Peeling → Heating (140° C.) → Heating (190° C.)
Process B-1: Casting → Peeling → Heating (190° C.)
Process B-2: Casting → Peeling → Heating (180° C.)
Process B-3: Casting → Peeling → Heating (140° C.)
Process C-1: Casting → Peeling → Heating (140° C.) → Light Irradiation (Photopolymerization)
Process C-2: Casting → Peeling → Light Irradiation (Photopolymerization) → Heating (140° C.)
Process C-3: Casting → Light Irradiation (Photopolymerization) → Peeling → Heating (140° C.) → Light Irradiation (Photopolymerization)
Process D: Casting → Peeling → Heating (140° C.) → Applynig Coating Liquid for Hard Coat Layer → Light Irradiation (Photopolymerization)
[4] Thickness of Region (Region 3, * in Table 1) Adjacent to Region 2 on Interface Opposite to Region 1, in which Cellulose Acylate is Detected as Main Component and Polymer is Not Detected or Region (** in Table 1) in which Polymer is Detected as Main Component and Cellulose Acylate is Not Detected
[5] Evaluation Result on Surface of First Layer
[6] Evaluation Result on Surface of Another First Layer Evaluation Result According to a comparison between the examples and the comparative examples, it is possible to confirm that the hard coat films having a laminated structure prepared in the examples have preferable results (have high abrasion resistance) in both test methods of the pencil hardness test and the SW resistance test, and the adhesiveness between the first layer and the second layer is excellent, and thus, a decrease in the durability due to the peeling of the laminated film is suppressed.

In addition, according to a comparison between Example 1 and Examples 23 and 24, it was confirmed that the film thickness of the first layer to be formed increased by decreasing the acetyl substitution degree of the cellulose acylate in the dope B, and thus, the pencil hardness was further improved.

<Preparation of Polarizing Plate>

(Saponification Treatment of Polarizing Plate Protective Film)

Each of the hard coat films obtained in Examples 1 to 20, 23, and 24 was dipped in an aqueous solution of sodium hydroxide of 2.3 mol/L at 55° C. for 3 minutes. The hard coat film was washed at room temperature in a water washing bath, and was neutralized at 30° C. by using a sulfuric acid of 0.05 mol/L. The hard coat film was washed again at room temperature in the water washing bath, and was dried by hot air at 100° C. Thus, the surface of the hard coat film was subjected to a saponification treatment.

(Preparation of Polarizing Plate)

Iodine was adsorbed in a stretched polyvinyl alcohol film, and thus, a polarizer was prepared.

The hard coat film which had been subjected to the saponification treatment was bonded to one surface of the polarizer by using a polyvinyl alcohol-based adhesive such that the first layer was positioned on the outermost layer. A commercially available cellulose triacetate film (FUJITAC TD80UF, manufactured by Fujifilm Corporation) was subjected to the same saponification treatment, and the cellulose triacetate film after being subjected to the saponification treatment was bonded onto the surface of the polarizer on a side opposite to the surface side onto which each of the hard coat films prepared as described above was bonded by using a polyvinyl alcohol-based adhesive.

At this time, a transmission axis of the polarizer and a slow axis of the hard coat film were arranged to be parallel to each other. In addition, the transmission axis of the polarizer and a slow axis of a commercially available cellulose triacetate film were arranged to be orthogonal to each other.

Thus, polarizing plates including the hard coat films obtained in Examples 1 to 20, 23, and 24 as a protective film were prepared.

<Evaluation of Light Resistance>

The polarizing plates including the hard coat films prepared in Example 2 and Examples 17 to 19 were subjected to light irradiation for 200 hours by using a xenone lamp. In each of the polarizing plates before and after the light irradiation, single plate transmittance was measured at each wavelength of 380 nm to 780 nm by using a spectrophotometer (VAP-7070 manufactured by JASCO Corporation), and the average value corrected by the spectral visible sensitivity at each wavelength was evaluated on the basis of the following criteria. In the evaluation results, polarizing plates including the hard coat films prepared in Examples 17 to 19 were set to A, and a polarizing plate including the hard coat film prepared in Example 2 was set to B. It is considered that a difference occurs in the evaluation results since the hard coat films prepared in Examples 17 to 19 contains an ultraviolet absorbent, and thus, the polarizer is rarely affected by the light irradiation.

A: A transmittance change was less than 3%.

B: The transmittance change was greater than or equal to 3% and less than 20%.

C: The transmittance change was greater than or equal to 20%.

<Preparation of Liquid Crystal Display Device>

A polarizing plate on a visible side of a commercially available liquid crystal television (BRAVIA J5000 manufactured by Sony Corporation) was peeled off, and each of the prepared polarizing plates was sequentially bonded onto the visible side (an observer side) by using a pressure sensitive adhesive such that the hard coat film of each of the examples described above was positioned on a side opposite to the liquid crystal cell side, and thus, a liquid crystal display device was obtained.

Thus, a liquid crystal display device was prepared.

The display performance of the prepared liquid crystal display device was excellent.

INDUSTRIAL APPLICABILITY

The present invention is useful in the field of producing various image display devices such as a liquid crystal display device.

What is claimed is:

1. A hard coat film, comprising:
a first layer in which a polymer of a polymerizable composition containing at least one polyfunctional polymerizable compound having two or more polymerizable groups in one molecule is detected as a main component and an organic solvent-soluble resin is not detected by composition analysis using a RAMAN spectroscopy; and
a second layer adjacent to the first layer, in which an organic solvent-soluble resin and a polymer of a polymerizable composition containing at least one polyfunctional polymerizable compound having two or more polymerizable groups in one molecule are detected by the composition analysis, and a thickness is greater than 15 µm,
wherein the thickness of the second layer is greater than or equal to 340% thicker than a thickness of the first layer.

2. The hard coat film according to claim 1, wherein the organic solvent-soluble resin contains cellulose acylate.

3. The hard coat film according to claim 1, further comprising:
a third layer adjacent to the second layer on a side opposite to the first layer,
wherein the third layer is a layer in which a polymer of a polymerizable composition containing at least one polyfunctional polymerizable compound having two or more polymerizable groups in one molecule is not detected and an organic solvent-soluble resin is detected as a main component by the composition analysis.

4. The hard coat film according to claim 1, wherein the hard coat film is formed of the first layer and the second layer.

5. The hard coat film according to claim 1, further comprising:
another first layer adjacent to the second layer on a side opposite to the first layer,
wherein the another first layer is a layer in which a polymer of a polymerizable composition containing at least one polyfunctional polymerizable compound having two or more polymerizable groups in one molecule is detected as a main component and an organic solvent-soluble resin is not detected by the composition analysis.

6. The hard coat film according to claim 1, wherein a thickness of the second layer is greater than 15.0 µm and less than or equal to 500.0 µm.

7. The hard coat film according to claim 1, wherein a thickness of the first layer is greater than or equal to 0.5 µm and less than or equal to 20.0 µm.

8. The hard coat film according to claim 1, further comprising:
an ultraviolet absorbent.

9. The hard coat film according to claim 1, further comprising:
a surfactant.

10. The hard coat film according to claim 1, wherein the polymerizable group of the polyfunctional polymerizable compound is an ethylenically unsaturated bond-containing group.

11. The hard coat film according to claim 10, wherein the ethylenically unsaturated bond-containing group is a polymerizable group selected from the group consisting of an acryloyl oxy group, a methacryloyl oxy group, an acryloyl group, and a methacryloyl group.

12. An image display device, comprising:
the hard coat film according to claim 1.

13. A polarizing plate, comprising:
a polarizer; and
the hard coat film according to claim 1.

14. An image display device, comprising:
the polarizing plate according to claim 13.

15. The image display device according to claim 14, wherein the polarizing plate is provided on at least a visible side.

16. A method for producing a hard coat film wherein the hard coat film comprises:
a first layer in which a polymer of a polymerizable composition containing at least one polyfunctional polymerizable compound having two or more polymerizable groups in one molecule is detected as a main component and an organic solvent-soluble resin is not detected by composition analysis using a RAMAN spectroscopy; and
a second layer adjacent to the first layer, in which an organic solvent-soluble resin and a polymer of a polymerizable composition containing at least one polyfunctional polymerizable compound having two or more polymerizable groups in one molecule are detected by the composition analysis, and a thickness is greater than 15 µm,
wherein the thickness of the second layer is greater than or equal to 340% thicker than a thickness of the first layer, and
the method comprises:
forming a web by casting a composition containing a polymerizable composition containing at least one polyfunctional polymerizable compound having two or more polymerizable groups in one molecule, an organic solvent-soluble resin, and an organic solvent onto a support; and
performing a polymerization treatment of the polymerizable compound with respect to the web;
further comprising performing a web heat treatment of the web formed by the casting to providing a surface layer region which becomes a first layer by the polymerization treatment on at least one surface layer of the web.

17. The method for producing the hard coat film according to claim 16,
wherein the web heat treatment is performed to leach the polyfunctional polymerizable compound onto a surface of the web.

18. The method for producing the hard coat film according to claim 16,
wherein the polymerization treatment is performed by heating.

19. The method for producing the hard coat film according to claim 16,
wherein the polymerization treatment is performed by light irradiation.

20. The method for producing the hard coat film according to claim 16,
wherein the casting is performed by co-casting the composition and other compositions.

21. The method for producing the hard coat film according to claim 20,
wherein the other compositions are compositions which contain an organic solvent-soluble resin, and do not contain a polyfunctional polymerizable compound having two or more polymerizable groups in one molecule.

* * * * *